United States Patent
Ono et al.

(10) Patent No.: US 9,800,070 B2
(45) Date of Patent: Oct. 24, 2017

(54) DISCHARGING CONTROL SYSTEM OF VEHICLE, DISCHARGING CONNECTOR, VEHICLE, AND DISCHARGING CONTROL METHOD OF VEHICLE

(71) Applicants: Tomoya Ono, Toyota (JP); Shigeki Kinomura, Toyota (JP); Yoshiyuki Igarashi, Anjo (JP)

(72) Inventors: Tomoya Ono, Toyota (JP); Shigeki Kinomura, Toyota (JP); Yoshiyuki Igarashi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 14/416,419

(22) PCT Filed: Oct. 23, 2013

(86) PCT No.: PCT/IB2013/002367
§ 371 (c)(1),
(2) Date: Jan. 22, 2015

(87) PCT Pub. No.: WO2014/068380
PCT Pub. Date: May 8, 2014

(65) Prior Publication Data
US 2015/0263560 A1  Sep. 17, 2015

(30) Foreign Application Priority Data
Oct. 29, 2012 (JP) .................................. 2012-237650

(51) Int. Cl.
*H02H 7/00* (2006.01)
*H02J 7/00* (2006.01)
(Continued)

(52) U.S. Cl.
CPC ............ *H02J 7/0063* (2013.01); *B60L 1/006* (2013.01); *B60L 11/12* (2013.01);
(Continued)

(58) Field of Classification Search
CPC ........ B60L 11/08; B60L 11/12; B60L 11/123; B60L 11/14; B60L 11/1818;
(Continued)

(56) References Cited

U.S. PATENT DOCUMENTS

2010/0079105 A1   4/2010  Iwanaga et al.
2012/0206104 A1*  8/2012  Tsuchiya ............. B60L 11/1842
                                                       320/134
(Continued)

FOREIGN PATENT DOCUMENTS

EP   2 309 617 A1   4/2011
EP   2 447 106 A1   5/2012
(Continued)

OTHER PUBLICATIONS

"SAE Electric Vehicle Conductive Charge Coupler." SAE Standards: J1772, SAE International, Nov. 2001.
(Continued)

*Primary Examiner* — Vuthe Siek
(74) *Attorney, Agent, or Firm* — Oliff PLC

(57) ABSTRACT

A discharging control system of a vehicle that supplies power to a load device outside the vehicle via a power cable, includes a connection signal line, a detector, and a controller. The connection signal line is configured such that a potential thereof changes in response to a discharging connector provided on the power cable being connected to the vehicle. The detector is configured to detect the potential of the connection signal line. The controller is configured to con-
(Continued)

trol a physical quantity related to the power supplied from the vehicle to the load device, based on the potential detected by the detector.

5 Claims, 21 Drawing Sheets

(51) Int. Cl.
*B60L 1/00* (2006.01)
*B60L 11/12* (2006.01)
*B60L 11/18* (2006.01)
*B60L 11/08* (2006.01)
*B60L 11/14* (2006.01)

(52) U.S. Cl.
CPC ....... *B60L 11/1818* (2013.01); *B60L 11/1838* (2013.01); *B60L 11/1861* (2013.01); *B60L 11/08* (2013.01); *B60L 11/123* (2013.01); *B60L 11/14* (2013.01); *B60L 2210/40* (2013.01); *B60L 2220/14* (2013.01); *B60L 2230/12* (2013.01); *B60L 2230/16* (2013.01); *H02J 2007/0067* (2013.01); *Y02T 10/6217* (2013.01); *Y02T 10/7005* (2013.01); *Y02T 10/7077* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01)

(58) Field of Classification Search
CPC .. B60L 11/1838; B60L 11/1861; B60L 1/006; B60L 2210/40; B60L 2220/14; B60L 2230/12; B60L 2230/16; H02J 2007/0067; H02J 7/0063
See application file for complete search history.

(56) References Cited

U.S. PATENT DOCUMENTS

| | | | |
|---|---|---|---|
| 2013/0076123 A1* | 3/2013 | Suzuki | B60L 11/1816 307/9.1 |
| 2013/0082663 A1 | 4/2013 | Mori et al. | |
| 2013/0106350 A1* | 5/2013 | Ono | H01M 10/44 320/109 |
| 2013/0314034 A1 | 11/2013 | Ang | |

FOREIGN PATENT DOCUMENTS

| | | |
|---|---|---|
| JP | 2010-081740 A | 4/2010 |
| JP | 2012-070577 A | 4/2012 |
| WO | 2012/111081 A1 | 8/2012 |

OTHER PUBLICATIONS

U.S. Appl. No. 15/710,201 filed Sep. 20, 2017 in the name of Ono et al.

* cited by examiner

F I G . 20
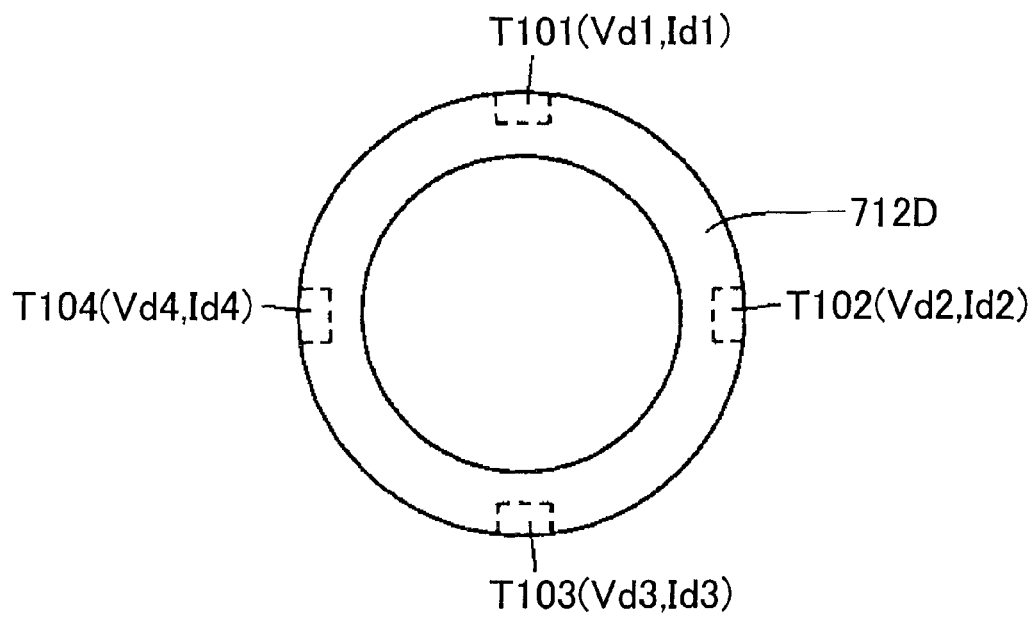
F I G . 21
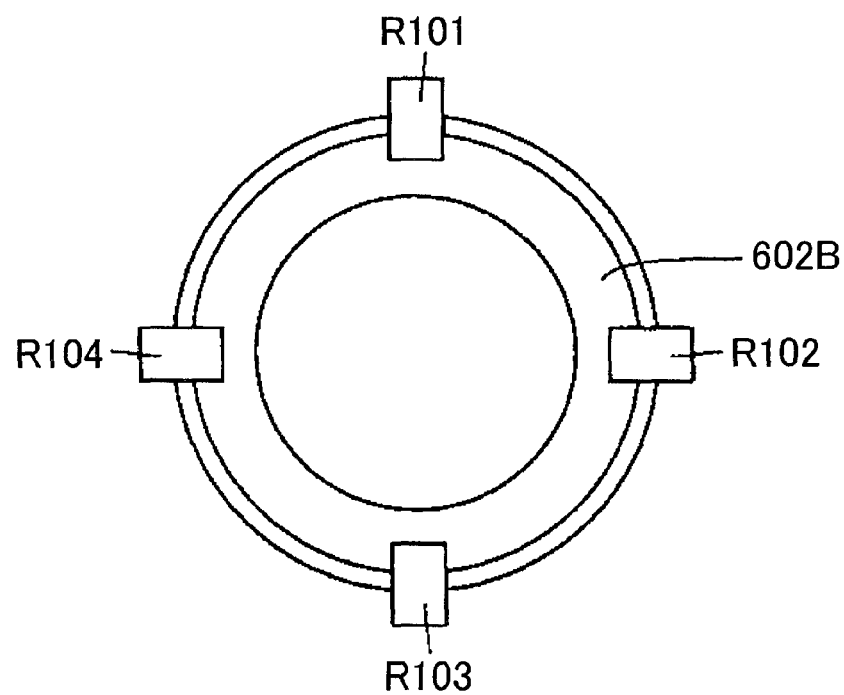

F I G . 22
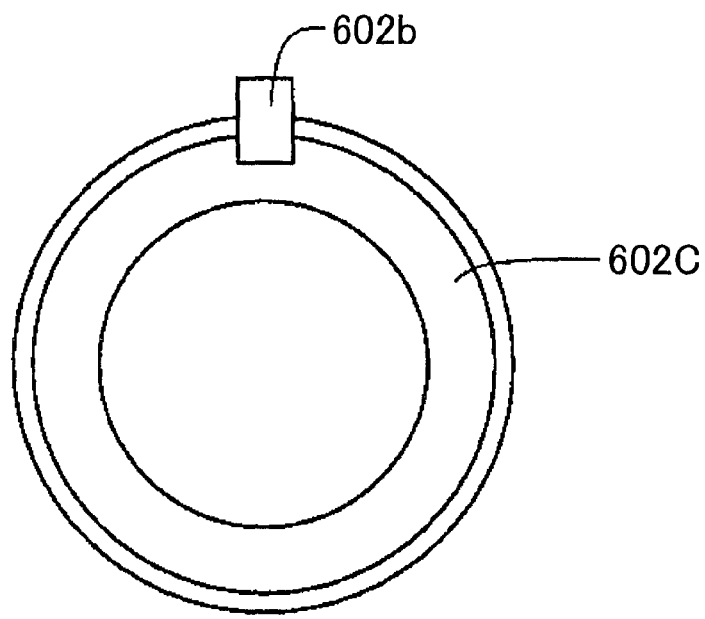
F I G . 23
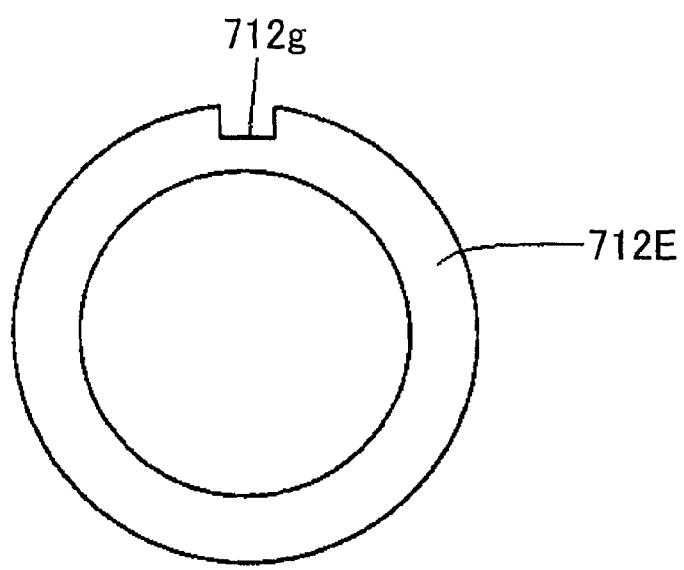

DISCHARGING CONTROL SYSTEM OF VEHICLE, DISCHARGING CONNECTOR, VEHICLE, AND DISCHARGING CONTROL METHOD OF VEHICLE

BACKGROUND OF THE INVENTION

1. Field of the Invention

The invention relates to a discharging control system of a vehicle, a discharging connector, a vehicle, and a discharging control method of a vehicle. More particularly, the invention relates to a discharging control system of a vehicle, a discharging connector, a vehicle, and a discharging control method of a vehicle, capable of supplying power to a load device outside the vehicle via power cable.

2. Description of Related Art

Japanese Patent Application Publication No. 2010-081740 (JP 2010-081740 A) describes a control system capable of detecting a connection state of a charging connector. This control system is provided with a detection circuit that is connected to an internal circuit of a charging connector provided on the charge cable when the charging connector is connected to a vehicle. The connection state of the charging connector is detected based on the potential of a signal output from the detection circuit (JP 2010-081740 A).

Also, standards for a vehicle capable of charging a power storage device mounted in a vehicle from a power supply outside the vehicle are defined in SAE Electric Vehicle Conductive Charge Coupler (United States of America, SAE Standards, SAE International. November, 2001) or the like, for example.

However, when supplying power from the vehicle to a load device outside the vehicle, the vehicle must supply voltage and current to the connected load device according to the load device. However, neither JP 2010-081740 A nor SAE Electric Vehicle Conductive Charge Coupler make any particular mention of a method for transmitting information necessary when supplying power from the vehicle to the load device, to the vehicle.

SUMMARY OF THE INVENTION

Thus, the invention provides a discharging control system capable of setting information necessary when supplying power from a vehicle to a load device, as well as a vehicle provided with this discharging control system.

The invention also provides a discharging connector capable of transmitting information necessary when supplying power from a vehicle to a load device.

In addition, the invention provides a discharging control method of a vehicle, which enables information necessary when supplying power from a vehicle to a load device to be transmitted.

A first aspect of the invention relates to a control system having the structure described below. The control system is a discharging control system of a vehicle that supplies power to a load device outside the vehicle via a power cable, and includes a connection signal line, a detector, and a controller. The connection signal line is configured such that a potential thereof changes in response to a discharging connector provided on the power cable being connected to the vehicle. The detector is configured to detect the potential of the connection signal line. The controller is configured to control a physical quantity related to the power supplied from the vehicle to the load device, based on the potential detected by the detector.

Also, a second aspect of the invention relates to a discharging connector having the structure described below. The discharging connector is a discharging connector provided on a power cable that is provided on a vehicle that supplies power to a load device outside the vehicle, and that supplies power from the vehicle to the load device. The vehicle includes a connection signal line in which a potential changes in response to the discharging connector being connected to the vehicle. The discharging connector includes a connecting portion and a setting portion. The connecting portion connects the power cable to the vehicle. The setting portion sets the potential of the connection signal line according to a physical quantity related to the power supplied from the vehicle to the load device, when the power cable is connected to the vehicle by the connecting portion.

Also, a third aspect of the invention relates to a vehicle that includes the control system described below. The control system is a discharging control system of a vehicle that supplies power to a load device outside the vehicle via a power cable, and includes a connection signal line, a detector, and a controller. The connection signal line is configured such that a potential thereof changes in response to a discharging connector provided on the power cable being connected to the vehicle. The detector is configured to detect the potential of the connection signal line. The controller is configured to control a physical quantity related to the power supplied from the vehicle to the load device, based on the potential detected by the detector.

Also, a fourth aspect of the invention relates to a control method having the structure described below. The control method is a discharging control method of a vehicle that supplies power to a load device outside the vehicle via a power cable. This control method includes detecting a potential of a connection signal line in which the potential changes in response to a discharging connector provided on the power cable being connected to the vehicle, and controlling a physical quantity related to the power supplied from the vehicle to the load device, based on the detected potential.

In the invention, the potential of the connection signal line changes in response to the discharging connector being connected to the vehicle. The physical quantity related to discharging from the vehicle to the load device is controlled based on the potential of the connection signal line. Therefore, the physical quantity can be set using the discharging connector. Hence, this invention enables information necessary when supplying power from the vehicle to the load device to be transmitted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 20 is a view illustrating a method for setting the shape of a connecting portion of a discharging connector according to a fifth example embodiment of the invention;

FIG. 21 is a view illustrating a connecting portion of an inlet according to the fifth example embodiment of the invention;

FIG. 22 is a view illustrating a connecting portion of an inlet according to a modified example of the fifth example embodiment of the invention;

FIG. 23 is a view of an example shape of a connecting portion of a discharging connector according to the modified example of the fifth example embodiment of the invention;

DETAILED DESCRIPTION OF EMBODIMENTS

Figure 1:
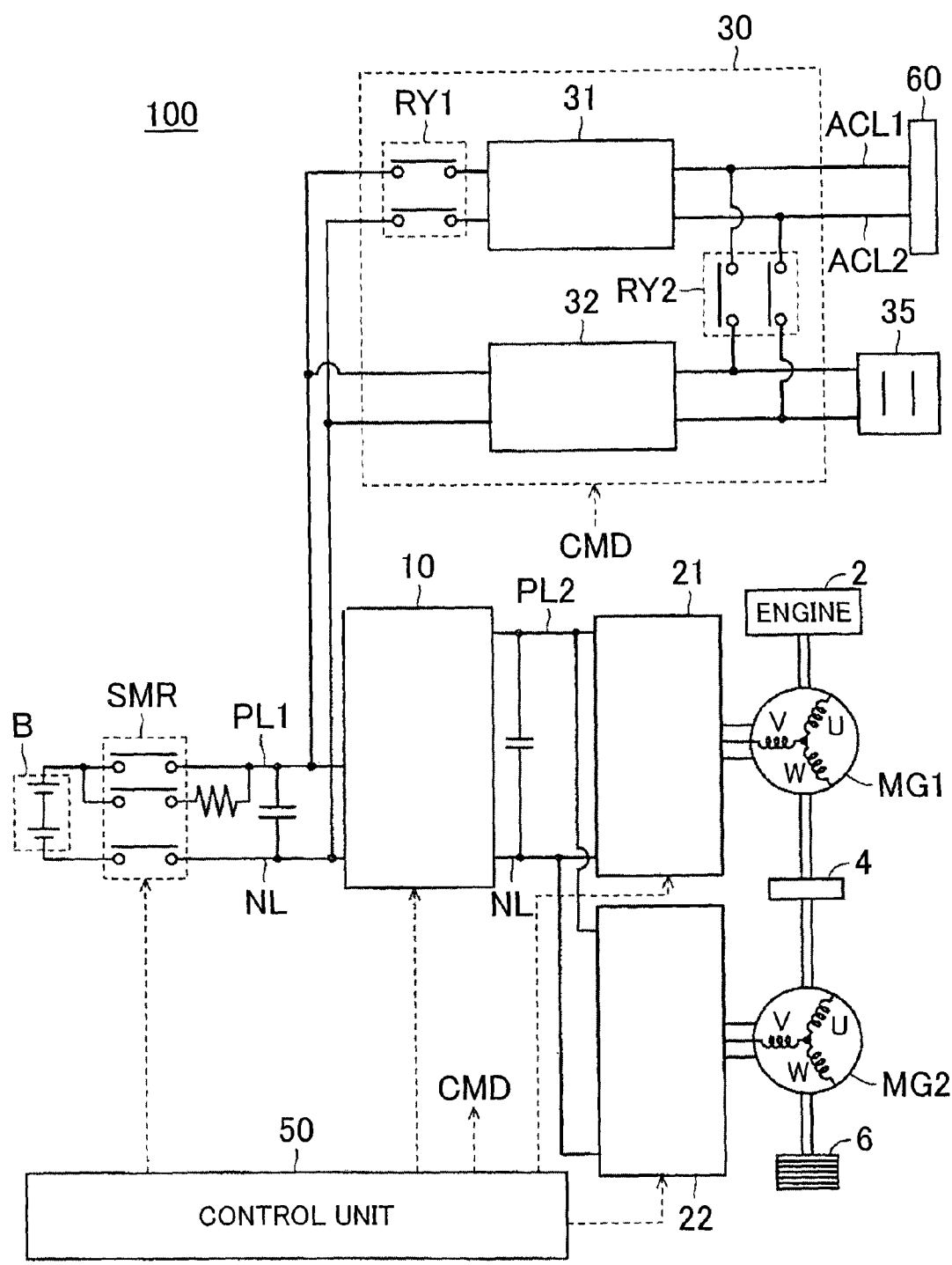
FIG. 1 is a block diagram of the overall structure of a vehicle to which a discharging control system according to a first example embodiment of the invention is applied.

Hereinafter, example embodiments of the invention will be described in detail with reference to the accompanying drawings. Like or corresponding portions in the drawings will be denoted by like reference characters and descriptions of those portions will not be repeated.

FIG. 1 is a block diagram of the overall structure of a vehicle to which a discharging control system according to a first example embodiment of the invention is applied. In the example embodiments below, the vehicle will be described as a hybrid vehicle, but the vehicle of the invention is not limited to a hybrid vehicle. Referring to FIG. 1, a vehicle 100 is provided with an engine 2, motor-generators MG1 and MG2, a power split device 4, and driving wheels 6. The vehicle 100 is also provided with a power storage device B, a system main relay SMR, a converter 10, inverters 21 and 22, and a control unit 50. In addition, the vehicle 100 is provided with a power converter 30, a receptacle 35, and an inlet 60.

The vehicle 100 is a hybrid vehicle that runs using the engine 2 and the motor-generator MG2 as power sources. Driving force generated by the engine 2 and the motor-generator MG2 is transmitted to the driving wheels 6.

The engine 2 is an internal combustion engine, such as a gasoline engine or a diesel engine, that outputs power by combusting fuel. The engine 2 is configured such that an operating state thereof, e.g., a throttle opening amount (intake air amount), fuel supply quantity, and ignition timing, is able to be electrically controlled by signals from the control unit 50.

The motor-generators MG1 and MG2 are both alternating current (AC) rotary electric machines such as three-phase alternating current synchronous rotary electric machines. The motor-generator MG1 is able to be used both as a generator that is driven by the engine 2, and as an electric motor that is capable of starting the engine 2. Power obtained as a result of the motor-generator MG1 generating power can be used to drive the motor-generator MG2. Also, power obtained by as a result of the motor-generator MG1 generating power can be supplied to an external device that is connected to the vehicle 100. The motor-generator MG2 is mainly used as an electric motor that drives the driving wheels 6 of the vehicle 100.

The power split device 4 includes a planetary gear mechanism that has three rotating shafts, one of a sun gear, one of a carrier, and one of a ring gear, for example. The sun gear is connected to a rotating shaft of the motor-generator MG1. The carrier is connected to a crankshaft of the engine 2. The ring gear is connected to a drive shaft. The power split device 4 splits the driving force of the engine 2 into power that is transmitted to the rotating shaft of the motor-generator MG1, and power that is transmitted to the drive shaft. The drive shaft is connected to the driving wheels 6. The drive shaft is also connected to a rotating shaft of the motor-generator MG2.

The power storage device B is a direct current (DC) power supply that can be charged and discharged, and is formed by a secondary battery such as a nickel-metal hydride battery or a lithium-ion battery, or a capacitor, for example. The power storage device B supplies power to the converter 10, and is charged with power from the converter 10 when power is being regenerated.

The system main relay SMR is provided between the power storage device B and the converter 10. The system main relay SMR is a relay for electrically connecting/disconnecting the power storage device B to/from an electrical system, and is controlled on and off by the control unit 50.

The converter 10 steps up the voltage from the power storage device B, and supplies it to the inverters 21 and 22. The converter 10 also steps down the voltage generated by the motor-generators MG1 and MG2 and rectified by the inverters 21 and 22, and uses it to charge the power storage device B.

The inverters 21 and 22 are connected in parallel to the converter 10. The inverters 21 and 22 are controlled by signals from the control unit 50. The inverters 21 and 22 convert direct current (DC) power supplied from the converter 10 to alternating current (AC) power and drive the motor-generators MG1 and MG2.

The power converter 30 is configured to be able to send and receive power to and from an external device, not shown, that is connected to the inlet 60. Further, the power converter 30 is configured to be able to supply power to electrical equipment connected to the receptacle 35 provided in a vehicle cabin. The power converter 30 is connected to the inlet 60, the receptacle 35, and a positive line PL1 and a negative line NL between the system main relay SMR and the converter. The power converter 30 may also be connected to a power line between the power storage device B and the system main relay SMR. The power converter 30 includes a charger 31, an inverter 32, and relays RY1 and RY2.

The charger 31 is connected to the inlet 60 via power lines ACL1 and ACL2, and is connected to the positive line PL1 and the negative line NL via the relay RY1. The charger 31 converts charging power supplied from the external device that is connected to the inlet 60 to the voltage level of the power storage device B and outputs it to the power storage device B to charge the power storage device B, based on a signal CMD from the control unit 50. Hereinafter, the charging of the power storage device B using power from an external device may also be referred to as "external charging".

The inverter 32 is connected to the positive line PL1 and the negative line NL, and is connected to the inlet 60 via the relay RY2 and the power lines ACL1 and ACL2. Moreover, the inverter 32 is connected to the receptacle 35. The inverter 32 is able to convert at least one of the stored power of the power storage device B and the generated power of the motor-generator MG1 to supply power to be supplied to the external device connected to the inlet 60, and output this converted power to the external device.

Also, the inverter 32 is able to convert the stored power of the power storage device B to supply power to be supplied to the electrical equipment connected to the receptacle 35, and output the converted power to the electrical equipment. The inverter 32 is controlled based on the signal CMD from the control unit 50. Hereinafter, the discharging of at least one of the power of the power storage device B and the generated power of the motor-generator MG1 to the external device may also be referred to as "external discharging".

The relays RY1 and RY2 are opened and closed based on signals CMD from the control unit 50. The relay RY1 is closed when external charging is performed and is opened when external discharging is performed. The relay RY2 is opened when external charging is performed and is closed when external discharging is performed.

The inlet 60 is configured so as to be able to serve as both a discharging port for discharging power of the vehicle 100 to an external device, and a charging port for charging the vehicle 100 from an external power supply. As will be described later, the inlet 60 includes a terminal to which a power line is connected, and a terminal to which a signal line is connected. The signal line includes a signal line for detecting whether a connector of a cable connected to the external device is connected to the inlet 60.

The control unit 50 determines a target driving force to be transmitted to the driving wheels 6 based on an accelerator operating amount, a brake depression amount, and vehicle speed and the like. Also, the control unit 50 controls the engine 2 and the motor-generators MG1 and MG2 to achieve an operating state in which the target driving force can be output efficiently. Furthermore, when an external device or an external power supply is connected to the inlet 60, the control unit 50 switches between executing external charging and executing external discharging by controlling the power converter 30 and the relays RY1 and RY2.

In a structure such as that described above, when the control unit 50 executes external discharging, the control unit 50 must control the inverter 32 according to the external device that is connected to the vehicle 100. More specifically, a maximum value of current able to be received by a load device and the required voltage of the external device differs for each external device, so the control unit 50 must limit the output current so that it does not exceed the maximum current value, and output voltage according to the required voltage of the external device that is connected to the vehicle 100. The maximum value of current able to be received by the load device will hereinafter be referred to as the "maximum current value".

Therefore, in this example embodiment, information related to the maximum current value and the required voltage and the like of the connected external device is transmitted from the connector to the vehicle 100 using a signal line for detecting whether a connector of a cable that is connected to the external device is connected to the inlet 60. That is, the structure is such that detection of whether a connector is connected to the inlet 60 and the transmission of information from the connector to the vehicle 100 are able to be executed with a single signal line. Hereinafter, this specific structure will be described.

Figure 2:
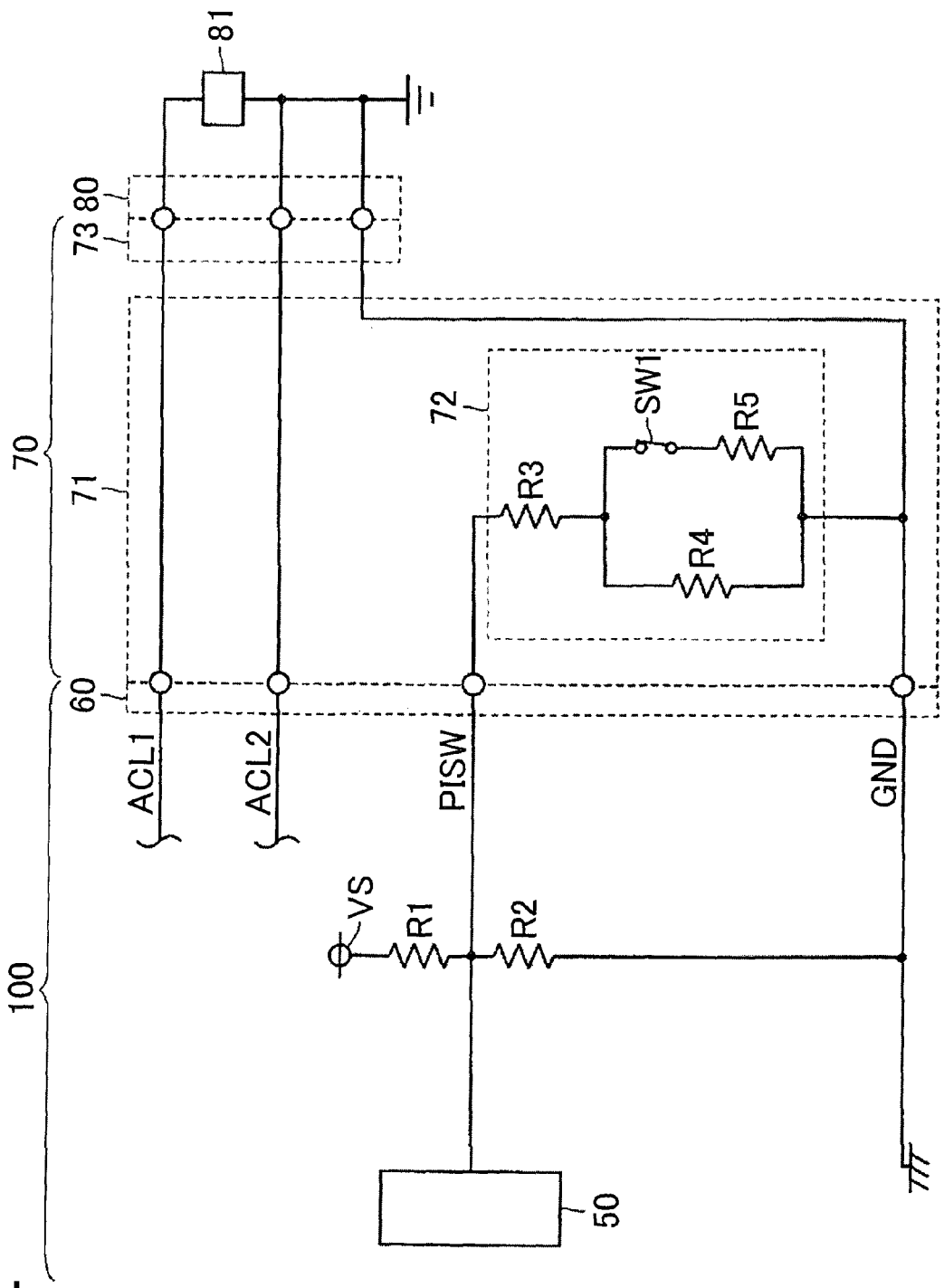
FIG. 2 is a circuit diagram of a connection state of a load device, a power cable, and the vehicle shown in FIG. 1.
Figure 3:
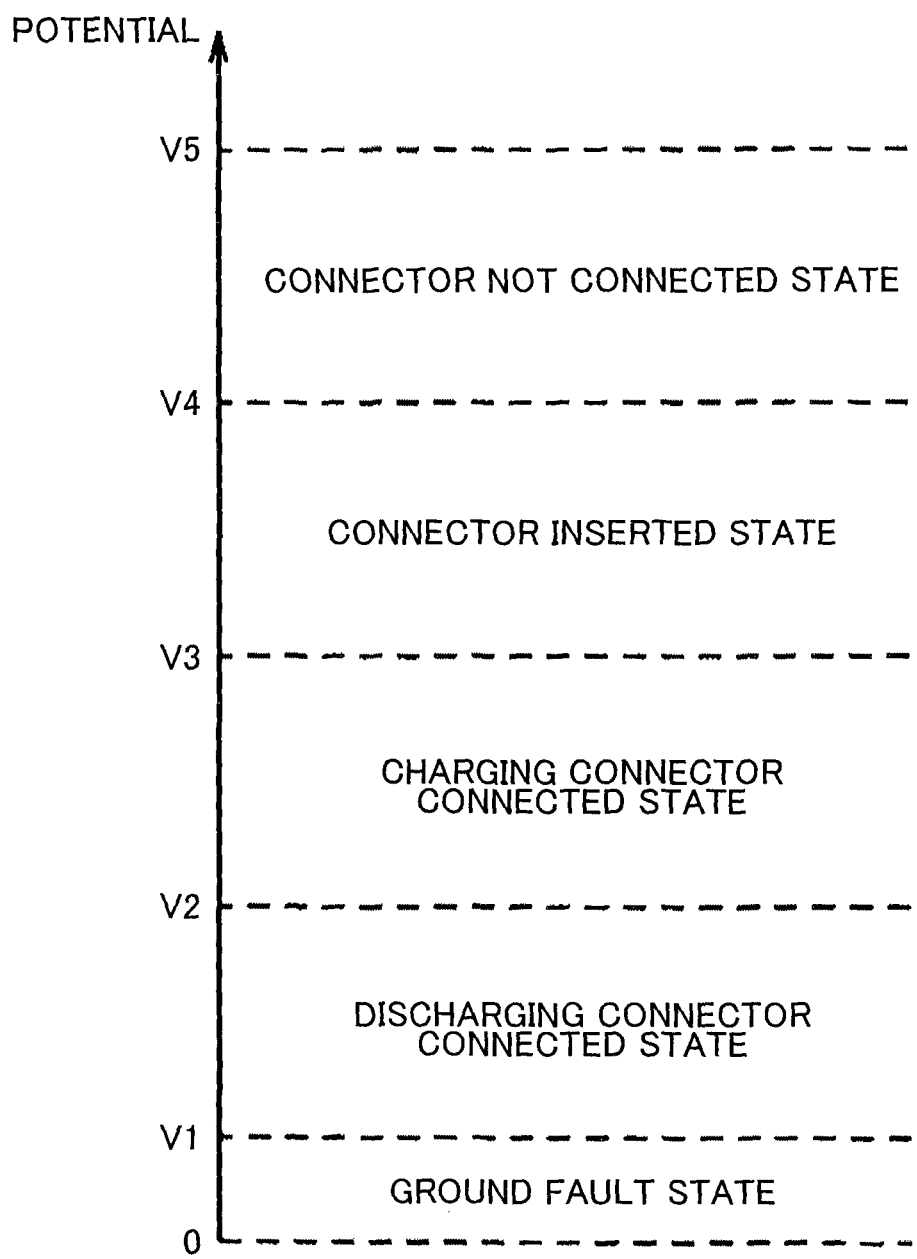
FIG. 3 is a view of an example of a relationship between the connection state and a potential of a connection signal line shown in FIG. 2.

FIG. 2 is a circuit diagram of a connection state of a load device, a power cable, and the vehicle shown in FIG. 1. FIG. 3 is a view of an example of a relationship between the connection state and a potential of a connection signal line PISW (that will be described later) shown in FIG. 2. The relationship between the connection state and the potential of the connection signal line PISW is not limited to the relationship shown in FIG. 3.

Referring to FIGS. 2 and 3, a power cable 70 electrically connects the vehicle 100 to a load device 81 that is an external device. Power output from the vehicle 100 is transmitted to the load device 81 by the power cable 70.

The power cable 70 includes a discharging connector 71 and a connector 73. The discharging connector 71 is configured to be able to connect to the inlet 60 of the vehicle 100. The connector 73 is configured to be able to connect to a connector 80 that is connected to the load device 81. The power lines ACL1 and ACL2 of the vehicle 100 are connected to a power line of the load device 81 via the power cable 70.

The vehicle 100 has the connection signal line PISW for producing a proximity detection signal indicative of the connection state between the discharging connector 71 and the inlet 60. The connection signal line PISW is connected to a connection node of a resistor R1 and a resistor R2. The resistor R1 and the resistor R2 are connected in series between a power supply node VS and a ground wire GND. The ground wire GND is connected to a body earth of the vehicle 100. The control unit 50 includes a detecting portion that detects a potential VP of the connection signal line PISW.

The resistance values of the resistors R1 and R2 are set such that the potential VP is between a potential V4 and a potential V5 when the discharging connector 71 is not connected to the inlet 60 of the vehicle 100 (hereinafter, also referred to as a "connector not connected state"). The control unit 50 is able to detect that the connection state is the "connector not connected state" by detecting that the potential VP is between the potential V4 and the potential V5.

When the discharging connector 71 is connected to the inlet 60 of the vehicle 100, the connection signal line PISW and the ground wire GND are connected to a circuit 72 of the discharging connector 71. The circuit 72 includes resistors R3 to R5 and a switch SW1. The resistor R3, the switch SW1, and the resistor R5 are connected in series between the connection signal line PISW and the ground wire GND. The resistor R4 is connected in parallel to the switch SW1 and the resistor R5.

The switch SW1 is a switch for detecting a state of a lock mechanism, not shown, provided in the discharging connector 71. This lock mechanism is provided so that the discharging connector 71 does not separate from the inlet 60. When a user disconnects the discharging connector 71 from the inlet 60, the lock mechanism is released by the user pushing in an operating button provided on the discharging connector 71. The switch SW1 is open when the operating button is pushed in, and closes when the operating button stops being pushed in.

The resistance values of the resistors R1 to R4 are set such that the potential VP is between a potential V3 and the potential V4 when the discharging connector 71 is connected to the inlet 60 and the lock mechanism of the discharging connector 71 is released (hereinafter, also referred to as a "connector inserted state"). The control unit 50 is able to detect that the connection state is the "connector inserted state" by detecting that the potential VP is between the potential V3 and the potential V4.

The resistance values of the resistors R1 to R5 are set such that the potential VP is between a potential V1 and a potential V2 when the discharging connector 71 is connected to the inlet 60 and the lock mechanism of the discharging connector 71 is operating (hereinafter, also referred to as a "discharging connector connected state"). The control unit 50 is able to detect that the connection state is the "discharging connector connected state" by detecting that the potential VP is between the potential V1 and the potential V2.

Here, the resistance value of the resistor R5 is set such that the potential VP is a potential according to the required voltage of the load device 81, between the potential V1 and the potential V2. The control unit 50 calculates the required voltage of the load device 81 based on the potential VP. As a result, the required voltage of the load device 81 is transmitted from the discharging connector 71 to the vehicle 100. The control unit 50 is able to calculate the required voltage of the load device 81 according to the expression below, for example.

$$\text{Required voltage} = \text{Constant } A \times \text{Potential } VP \qquad (1)$$

The control unit 50 controls the inverter 32 such that the output voltage of the vehicle 100 comes to match the required voltage of the load device 81. As a result, power is able to be supplied from the vehicle 100 to the load device 81 that is connected to the vehicle 100, according to the load device 81.

In addition to the resistors R3 to R5, the circuit 72 may also include a resistor that is connected either in series or in parallel to the resistors R3 to R5. Also, the resistors included in the circuit 72 may be formed by variable resistors capable of changing the resistance value according to the required voltage of the load device 81. In this case, it is possible to set the combined resistance of the circuit 72 in steps, so the potential VP can be set flexibly according to the type of the load device 81.

When the potential VP is between the potential V2 and the potential V3, the control unit 50 detects that the charging connector for charging the power storage device B of the vehicle 100 is connected to the inlet 60 (hereinafter, also referred to as a "charging connector connected state"). When the potential VP falls below the potential V1, the control unit 50 detects that the connection signal line PISW is short-circuiting to the body earth of the vehicle 100 (hereinafter, also referred to as an "ground fault state").

Figure 4:
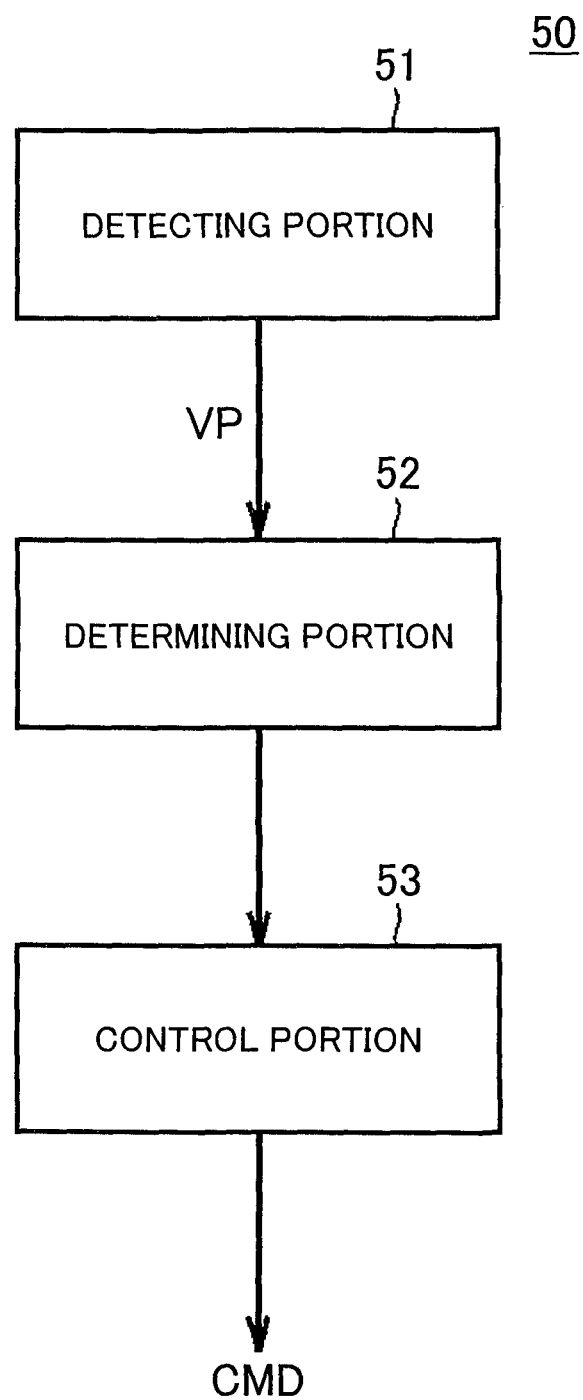
FIG. 4 is a functional block diagram related to discharging control of the control system shown in FIG. 1.

FIG. 4 is a functional block diagram related to discharging control of the control unit 50 shown in FIG. 1. Referring to FIG. 4, the control unit 50 includes a detecting portion 51, a determining portion 52, and a control portion 53.

The detecting portion 51 detects the potential VP of the connection signal line PISW. The detecting portion 51 outputs the detected potential VP to the determining portion 52.

The determining portion 52 determines the connection state between the discharging connector 71 and the inlet 60 based on the potential VP received from the detecting portion 51. More specifically, the determining portion 52 determines that the connection state is the "connector not connected state" when the potential VP is between the potential V4 and the potential V5. The determining portion 52 determines that the connection state is the "connector inserted state" when the potential VP is between the potential V3 and the potential V4. The determining portion 52 determines that the connection state is the "charging connector connected state" when the potential VP is between the potential V2 and the potential V3. The determining portion 52 determines that the connection state is the "discharging connector connected state" when the potential VP is between the potential V1 and the potential V2. The determining portion 52 determines that the connection state is the "ground fault state" when the potential VP is below the potential V1.

If it is determined that the connection state is the "discharging connector connected state", the determining portion 52 calculates the required voltage of the load device 81 based on the potential VP as described above. The determining portion 52 then outputs this calculated required voltage of the load device 81 to the control portion 53.

The control portion 53 controls the output voltage of the inverter 32 to the required voltage of the load device 81 received from the determining portion 52. The control portion 53 then outputs a signal CMD for controlling the inverter 32 to the inverter 32.

Figure 5:
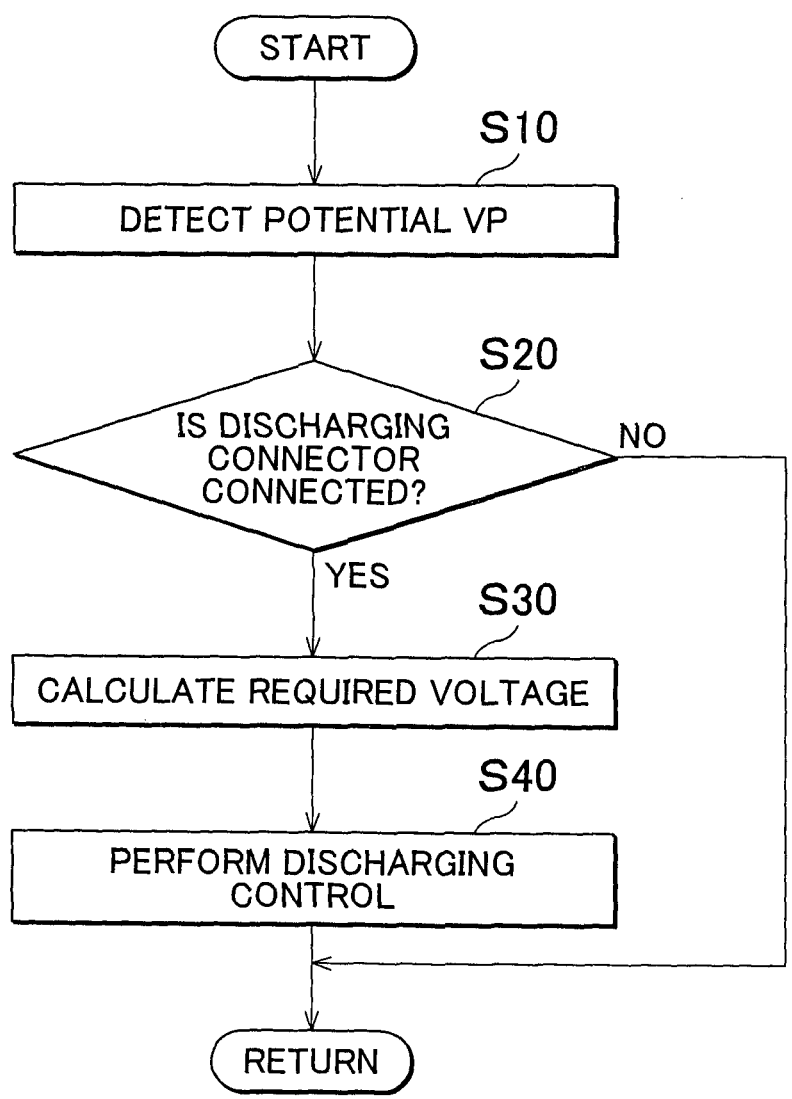
FIG. 5 is a flowchart illustrating the control structure of a routine related to discharging control executed by the control system shown in FIG. 1.

FIG. 5 is a flowchart illustrating the control structure of a routine related to discharging control executed by the control unit 50 shown in FIG. 1. The steps in the flowchart shown in FIG. 5 are realized by a program stored in advance in the control unit 50 being called up from a main routine, and executed in predetermined cycles or in response to a predetermined condition being satisfied. Alternatively, the processes may be realized by constructing special hardware (i.e., an electronic circuit) (the same also applies to the flowchart shown in FIG. 8 that will be described later).

Referring to FIG. 5, the control unit 50 detects the potential VP of the connection signal line PISW in step S10.

Next in step S20, the control unit 50 determines whether the connection state is the "discharging connector connected state". More specifically, the control unit 50 determines that the connection state is the "discharging connector connected state" when the potential VP is between potential V1 and potential V2. If it is determined that the connection state is not the "discharging connector connected state" (i.e., NO in step S20), the control unit 50 does not perform discharging control.

If it is determined that the connection state is the "discharging connector connected state" (i.e., YES in step S20), the control unit 50 calculates the required voltage of the load device 81 based on the potential VP as described above (step S30).

Continuing on, the control unit 50 controls discharging from the vehicle 100 to the load device 81 by controlling the inverter 32 such that the output voltage of the inverter 32 matches the required voltage of the load device 81 (step S40).

As described above, in this first example embodiment, the potential VP of the connection signal line PISW changes in response to the discharging connector 71 being connected to the vehicle 100. The control portion 53 of the control unit 50 controls the physical quantity related to discharging from the vehicle 100 to the load device 81 based on the potential VP of the connection signal line PISW. As a result, the discharging connector 71 is able to transmit information by changing the potential VP of the connection signal line PISW. Accordingly, with this first example embodiment, information required when supplying power from the vehicle 100 to the load device 81 is able to be transmitted.

In the first example embodiment, a case in which the required voltage of the load device is transmitted from the connector to the vehicle is described. In a second example embodiment of the invention, a case will be described in which, in addition to the required voltage of the load device, a maximum current value of the load device is transmitted.

Figure 6:
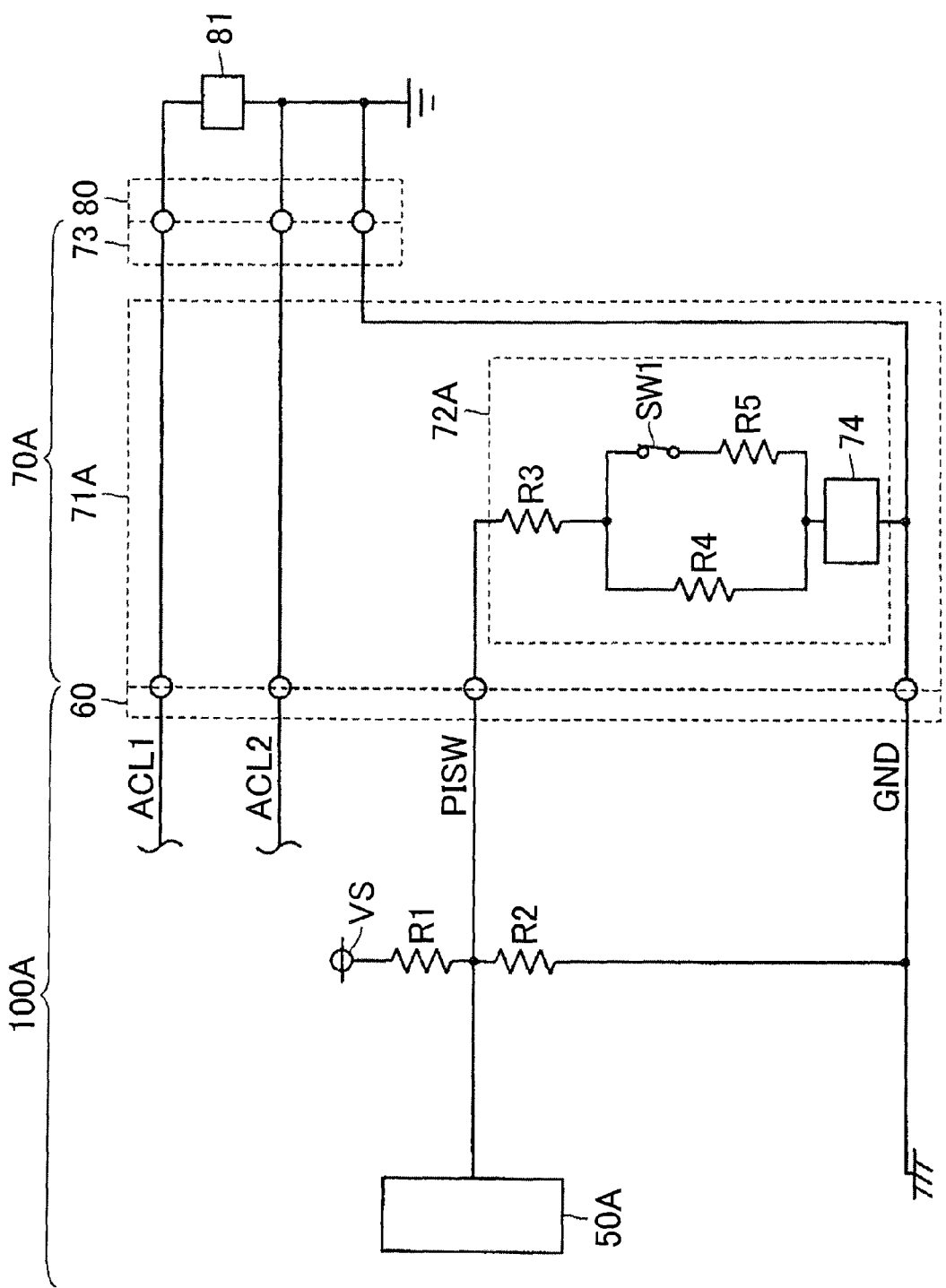
FIG. 6 is a circuit diagram of the connection state of a power cable, a load device, and a vehicle to which a discharging control system according to a second example embodiment of the invention is applied.
Figure 7:
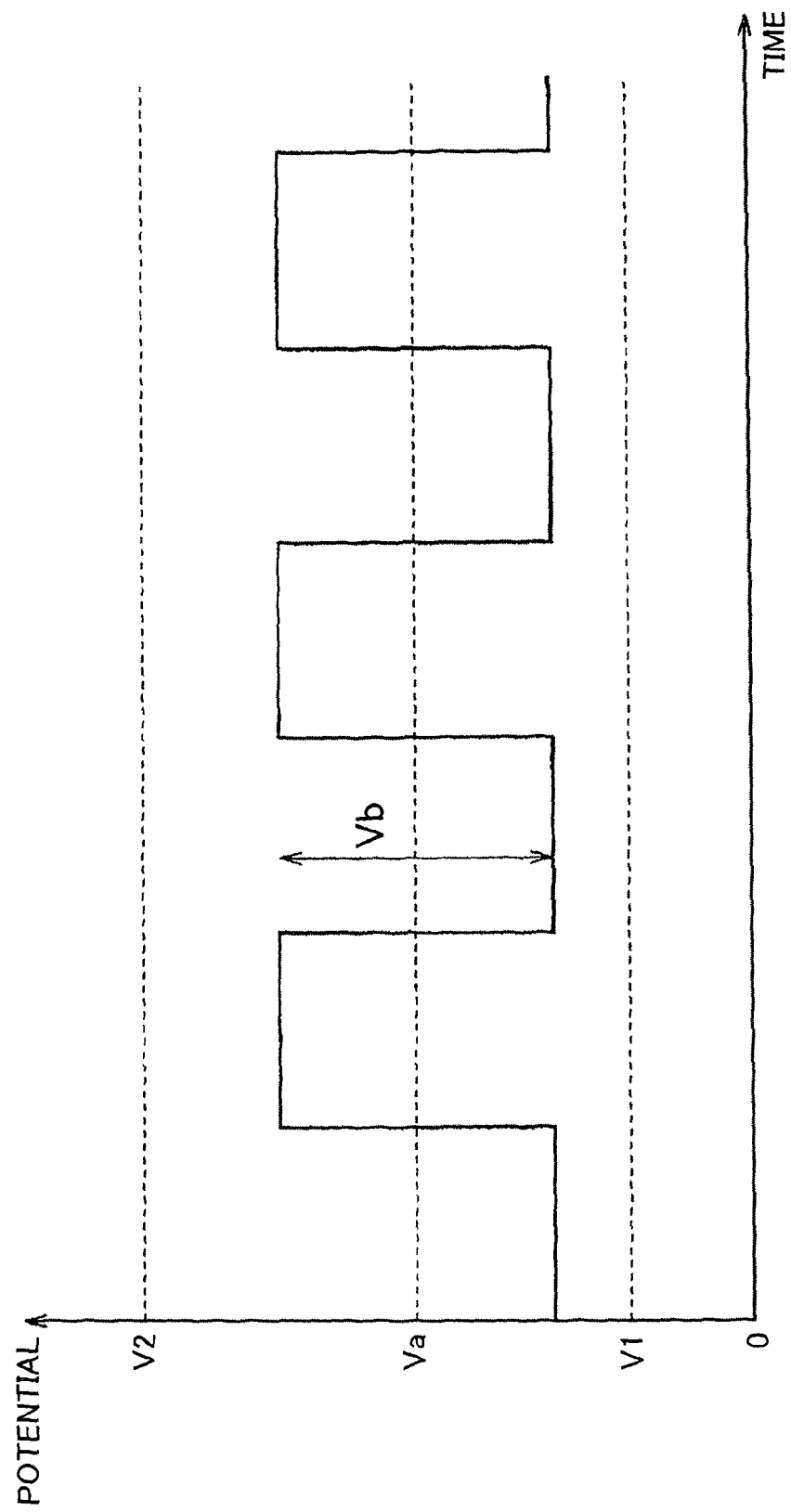
FIG. 7 is a view of an example of a waveform of a potential of a connection signal line shown in FIG. 6.

FIG. 6 is a circuit diagram of the connection state of a power cable, a load device, and a vehicle to which a discharging control system according to a second example embodiment of the invention is applied. FIG. 7 is a view of an example of a waveform of the potential VP of the connection signal line PISW shown in FIG. 6. The overall structure of the vehicle according to this second example embodiment is the same as the overall structure of the vehicle according to the first example embodiment shown in FIG. 1. Referring to FIGS. 6 and 7, a discharging connector 71A according to the second example embodiment includes a circuit 72A. This circuit 72A has a structure similar to that of the circuit 72 shown in FIG. 2, but also includes an oscillating circuit 74.

The oscillating circuit 74 is provided between the connection node of the resistors R4 and R5, and the ground wire GND. The oscillating circuit 74 oscillates the potential VP of the connection signal line PISW by a predetermined peak value Vb. Here, the peak value Vb is set to a value according to the maximum current value of the load device 81. Also, an average value Va of the potential VP is set to a value according to the required voltage of the load device 81.

A control unit 50A calculates the required voltage of the load device 81 based on the average value Va of the potential VP. Further, the control unit 50A calculates the maximum current value of the load device 81 based on the peak value Vb of the potential VP. The control unit 50A controls the inverter 32 based on the required voltage and the maximum current value of the load device 81. The control unit 50A may calculate the required voltage and the maximum current value of the load device 81 according to the expressions below, for example.

$$\text{Required voltage} = \text{Constant } B \times \text{Average value } Va \quad (2)$$

$$\text{Maximum current value} = \text{Constant } C \times \text{Peak value } Vb \quad (3)$$

Figure 8:
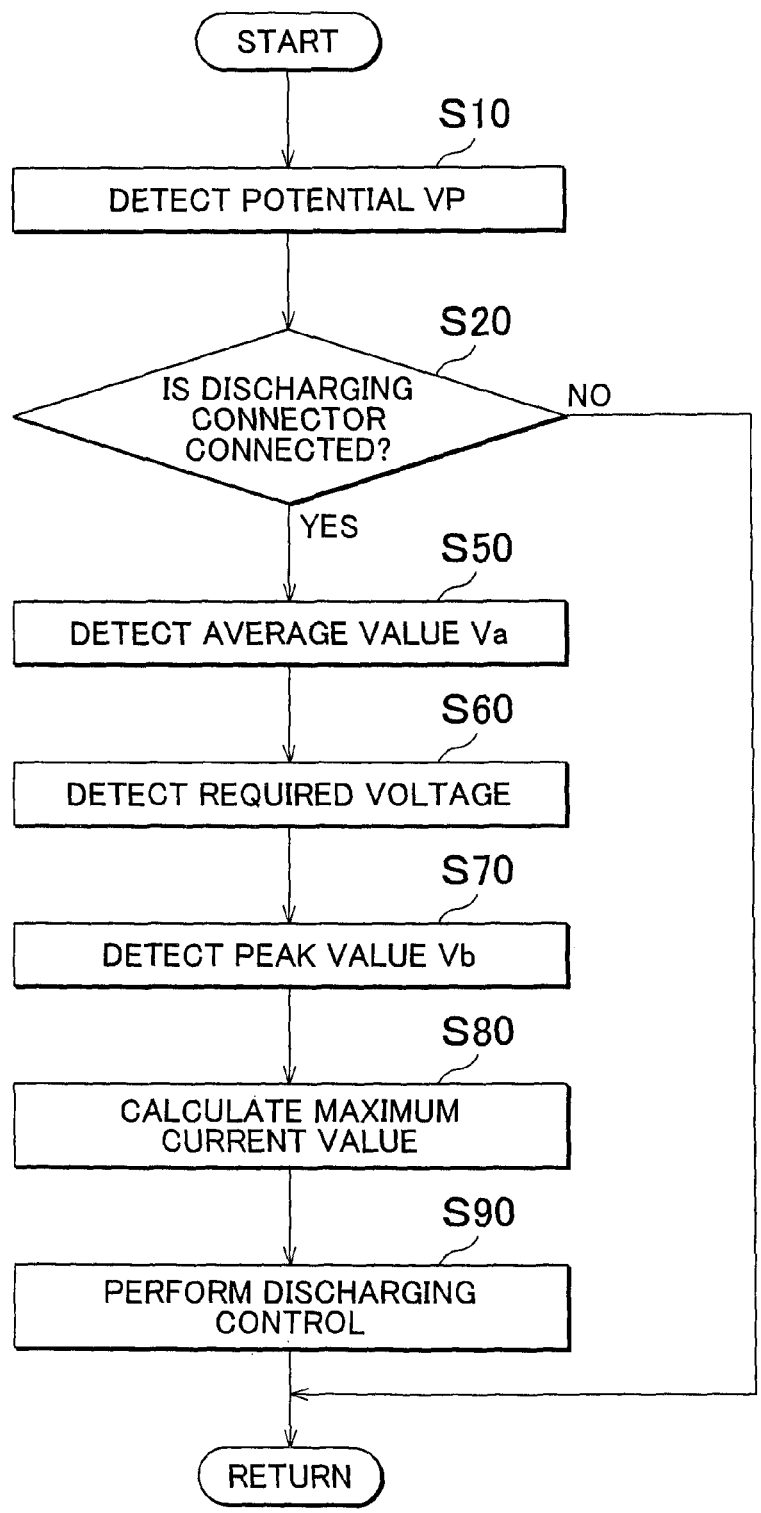
FIG. 8 is a flowchart illustrating the control structure of a routine related to discharging control executed by the control system shown in FIG. 6.

FIG. 8 is a flowchart illustrating the control structure of a routine related to discharging control executed by the control unit 50A shown in FIG. 6. Referring to FIG. 8, steps S10 and S20 are the same as they are in the first example embodiment so descriptions thereof will not be repeated.

If it is determined in step S20 that the connection state is the "discharging connector connected state" (i.e., YES in step S20), the control unit 50A detects the average value Va of the potential VP (step S50). Continuing on, in step S60, the control unit 50A calculates the required voltage of the load device 81 based on the average value Va of the potential VP as described above.

Next in step S70, the control unit 50A detects the peak value Vb of the potential VP. Then in step S80, the control unit 50A calculates the maximum current value of the load device 81 based on the peak value Vb of the potential VP as described above.

Next in step S90, the control unit 50A sets the voltage output from the inlet 60 to match the required voltage of the load device 81, and controls the inverter 32 to keep the current output from the inlet 60 equal to or less than the maximum current value of the load device 81.

As described above, in this second example embodiment, the oscillating circuit 74 for oscillating the potential VP of the connection signal line PISW is provided in the discharging connector 71A. The control unit 50A calculates the required voltage of the load device 81 based on the average value Va of the potential VP, and calculates the maximum current value of the load device 81 based on the peak value Vb of the potential VP. Therefore, with this second example embodiment, the output voltage and the maximum current value are able to be controlled according to the load device 81 that is connected.

In this second example embodiment, a case is described in which the required voltage of the load device 81 is calculated based on the average value Va of the potential VP, and the maximum current value of the load device 81 is calculated based on the peak value Vb of the potential VP. Alternatively, however, the maximum current value of the load device 81 may be calculated based on the average value Va of the potential VP, and the required voltage of the load device 81 may be calculated based on the peak value Vb of the potential VP.

In this second example embodiment, an ON-period ratio (duty ratio) of the potential VP or the oscillation cycle may be used instead of the average value Va and the peak value Vb of the potential VP.

In the first and second example embodiments, cases are described in which power is supplied from the vehicle to the load device using the power converter 30. In a third example embodiment of the invention, a case will be described in which power is supplied from the vehicle to the load device using the inverters 21 and 22.

Figure 9:
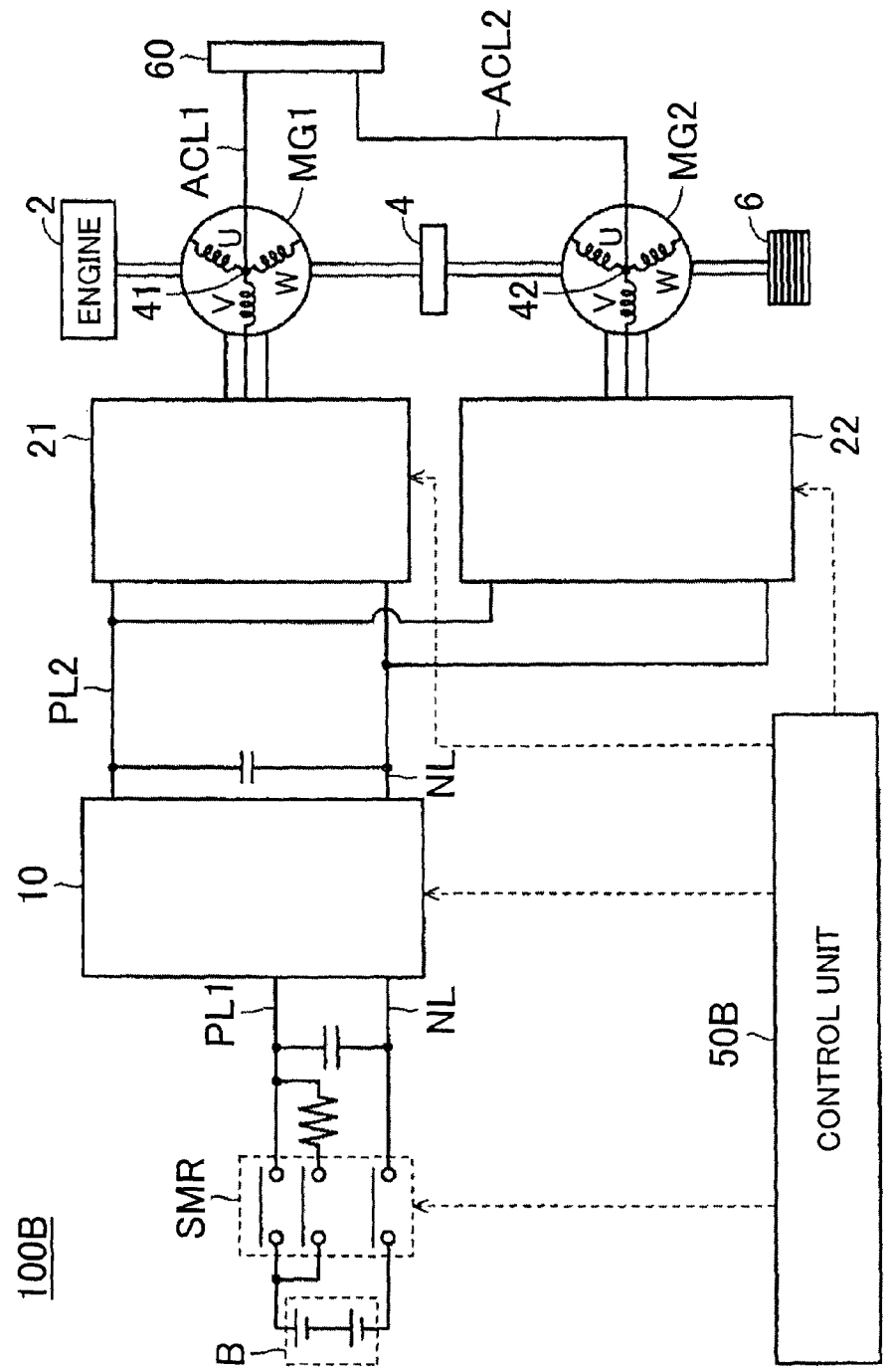
FIG. 9 is a block diagram of the overall structure of a vehicle to which a discharging control system according to a third example embodiment of the invention is applied.

FIG. 9 is a block diagram of the overall structure of a vehicle to which a discharging control system according to the third example embodiment of the invention is applied. Referring to FIG. 9, a vehicle 100B has a structure similar to the structure described in the first example embodiment, but the power converter 30 is not provided. The inlet 60 is connected to a neutral point of the motor-generators MG1 and MG2 via the power lines ACL1 and ACL2.

Each of the motor-generators MG1 and MG2 includes a Y-connected three-phase coil as a stator coil. The three-phase coil of the motor-generator MG1 is connected to the inverter 21, and the power line ACL1 is connected to a neutral point 41 of the three-phase coil. The three-phase coil of the motor-generator MG2 is connected to the inverter 22, and the power line ACL2 is connected to a neutral point 42 of the three-phase coil. Also, the inlet 60 is connected to end portions of the power lines ACL1 and ACL2 that are different from the ends that are connected to the neutral points.

Figure 10:
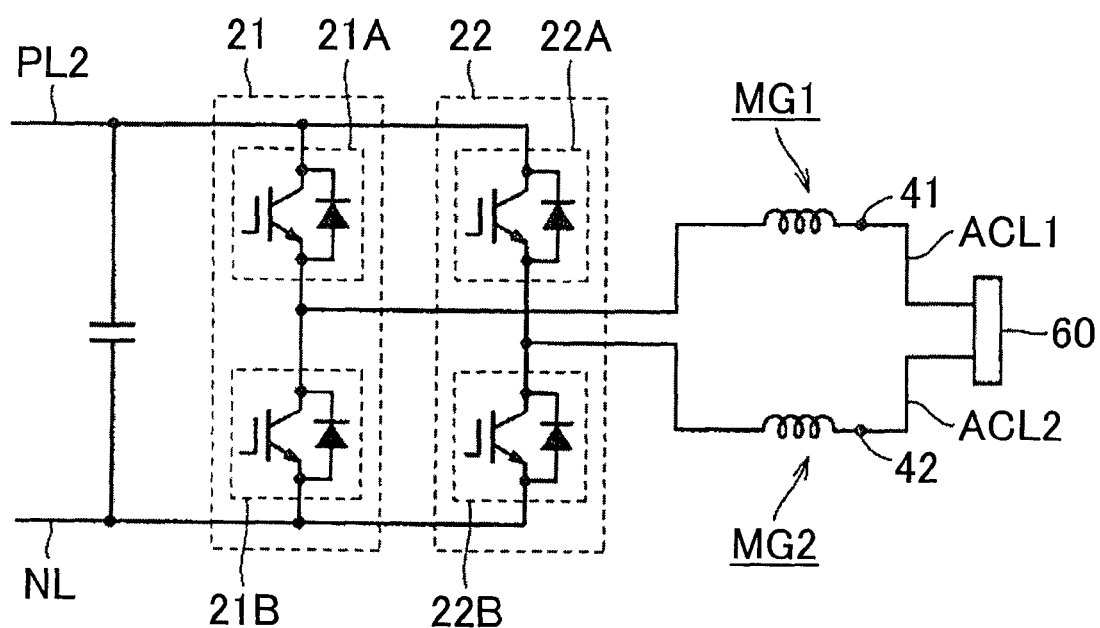
FIG. 10 is a view of a zero-phase equivalent circuit of motor-generators and inverters shown in FIG. 9.

FIG. 10 is a view of a zero-phase equivalent circuit of the inverters 21 and 22 and the motor-generators MG1 and MG2 shown in FIG. 9. Referring to FIG. 10, each of the inverters 21 and 22 is formed by a three-phase bridge circuit, and there are eight ON/OFF combinations (i.e., patterns) of six switching elements of each inverter. Of these eight switching patterns, two have an interphase voltage of zero. This kind of voltage state will be referred to as a zero voltage vector. With regards to the zero voltage vector, three switching elements on an upper arm may be regarded as being in the same switching state (i.e., all on or all off), and the three switching elements of a lower arm may also be regarded as being in the same switching state.

When power is supplied from the vehicle 100B to the load device 81, the zero voltage vector of the inverters 21 and 22 is controlled by the control unit 50B. Therefore, at this time, the three switching elements of the upper arm of each inverter may be regarded as being in the same switching state, and the three switching elements of the lower arm may also be regarded as being in the same switching state.

Thus, in FIG. 10, the three switching elements of the upper arm of the inverter 21 are collectively denoted as "upper arm 21A", and the three switching elements of the lower arm of the inverter 21 are collectively denoted as "lower arm 21B". Similarly, the three switching elements of the upper arm of the inverter 22 are collectively denoted as "upper arm 22A", and the three switching elements of the lower arm of the inverter 22 are collectively denoted as "lower arm 22B".

Also, as shown in FIG. 10, this zero-phase equivalent circuit may be regarded as a single-phase PWM inverter that generates single-phase AC voltage between the neutral points 41 and 42, using DC voltage supplied from the positive line PL2 and the negative line NL. Therefore, it is possible to covert the DC power supplied from the positive line PL2 and the negative line NL into AC power, and supply the resultant power to the load device 81 from the inlet 60, by changing the zero-voltage vector of each inverter 21 and 22, and performing switching control to operate the inverters 21 and 22 as arms of the single-phase PWM inverter.

At this time, the control unit 50B obtains information regarding the required voltage and maximum current value and the like of the connected external device, based on the potential VP of the connection signal line PISW, just as in the first and second example embodiments. Then the control unit 50B controls the supply of power from the inlet 60 to the load device 81 based on this information.

As described above, in this third example embodiment, power is supplied from the vehicle 100B to the load device 81 using the inverters 21 and 22, instead of the power converter 30. Therefore, in this third example embodiment, power is able to be supplied from the vehicle 100B to the load device 81 without separately providing a power converter. Also, voltage output from the vehicle 100B may be freely set within a range that is able to be output by the inverters 21 and 22.

In the first example embodiment, a case is described in which the potential of the connection signal line is set by setting the resistance of the circuit provided in the discharging connector according to the required voltage of the load device. In a fourth example embodiment of the invention, a case will be described in which a shape of a connecting portion of the discharging connector is set according to the required voltage of the load device and the maximum current value of the load device, and the potential of the connection signal line is set by setting the resistance of the circuit provided in the inlet of the vehicle according to the shape of the connecting portion of the discharging connector. In this fourth example embodiment, the shape of the connecting portion of the discharging connector may also be set according to one of the required voltage of the load device and the maximum current value of the load device.

Figure 11:
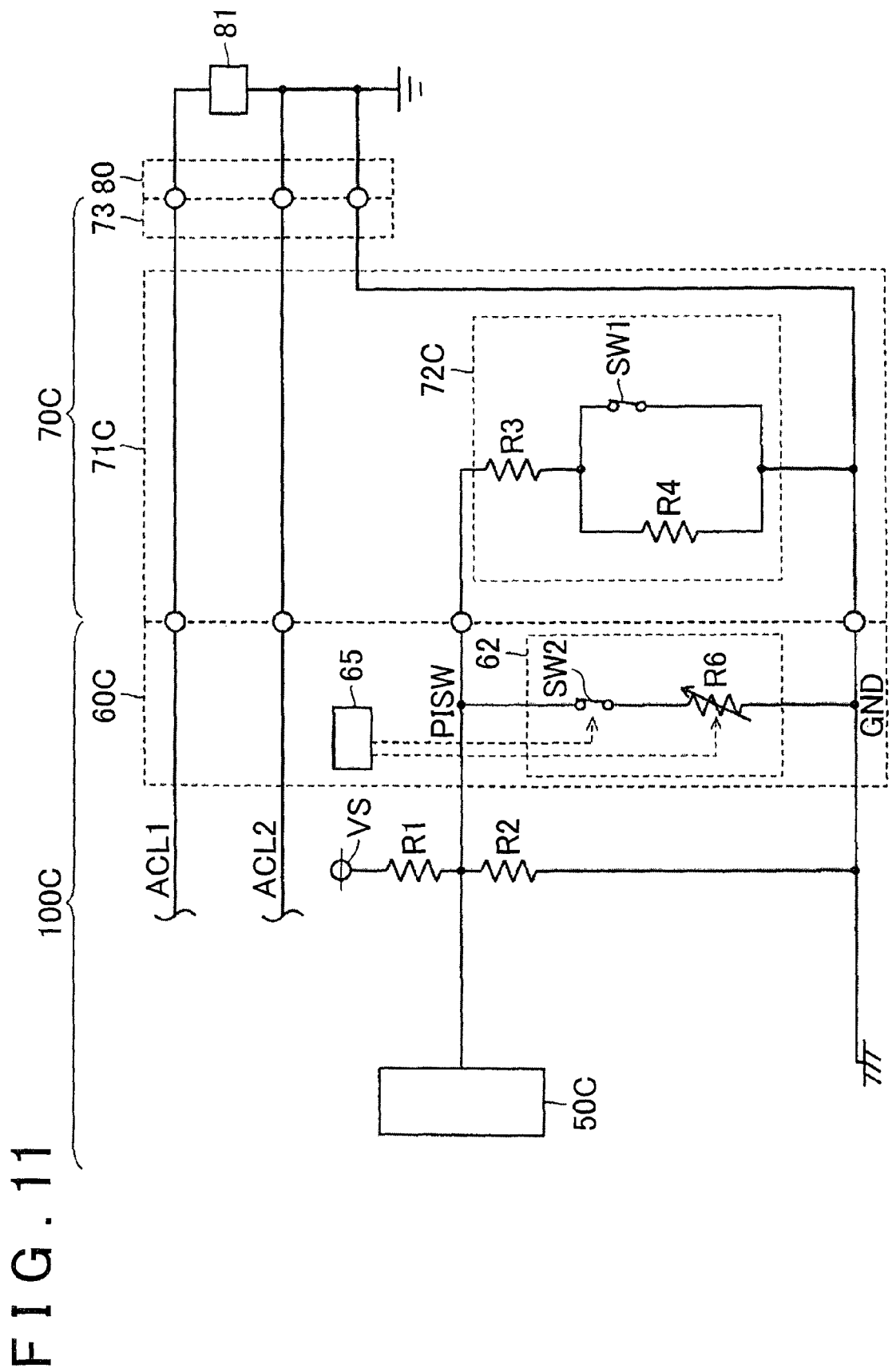
FIG. 11 is a circuit diagram of a connection state of a power cable, a load device, and a vehicle to which a discharging control system according to a fourth example embodiment of the invention is applied.

FIG. 11 is a circuit diagram of a connection state of a power cable, a load device, and a vehicle to which a discharging control system according to the fourth example embodiment of the invention is applied. The overall structure of the vehicle according to the fourth example embodiment is the same as the overall structure of the vehicle according to the first example embodiment shown in FIG. 1. Referring to FIG. 11, an inlet 60C of a vehicle 100C according to the fourth example embodiment includes a circuit 62 and a shape identifying portion 65. A circuit 72C of a discharging connector 71C according to the fourth example embodiment has a structure similar to that of the circuit 72 in the first example embodiment, except for that the resistor R5 is not provided.

The circuit 62 has a switch SW2 and a variable resistor R6. The switch SW2 and the variable resistor R6 are connected in series between the connection signal line PISW and the ground wire GND. The switch SW2 and the variable resistor R6 are controlled by signals from the shape identifying portion 65. The variable resistor R6 may also include a plurality of resistors that are connected in series or in parallel. In this case, the combined resistance of the circuit 62 is able to be set in steps, so the potential VP can be set flexibly according to the type of load device 81.

When the discharging connector 71C is connected to the inlet 60C, the shape identifying portion 65 closes the switch SW2. The shape identifying portion 65 identifies the shape of the connecting portion of the discharging connector 71C that is set according to the required voltage and the maximum current value of the load device 81, as will be described later. The shape identifying portion 65 changes the resistance value of the variable resistor R6 according to the identified shape.

A control unit 50C controls discharging from the vehicle 100C to the load device 81 based on the potential VP of the connection signal line PISW, just as in the first and second example embodiments. Therefore, information necessary when supplying power from the vehicle 100C to the load device 81 (e.g., the required voltage and the maximum current value of the load device 81 and the like) is able to be transmitted by changing the potential VP of the connection signal line PISW based on the shape of the discharging connector 71C. Hereinafter, a method of transmitting information from the discharging connector 71C to the vehicle 100C according to the shape of the connecting portion of the discharging connector 71C will be described in detail.

Figure 12:
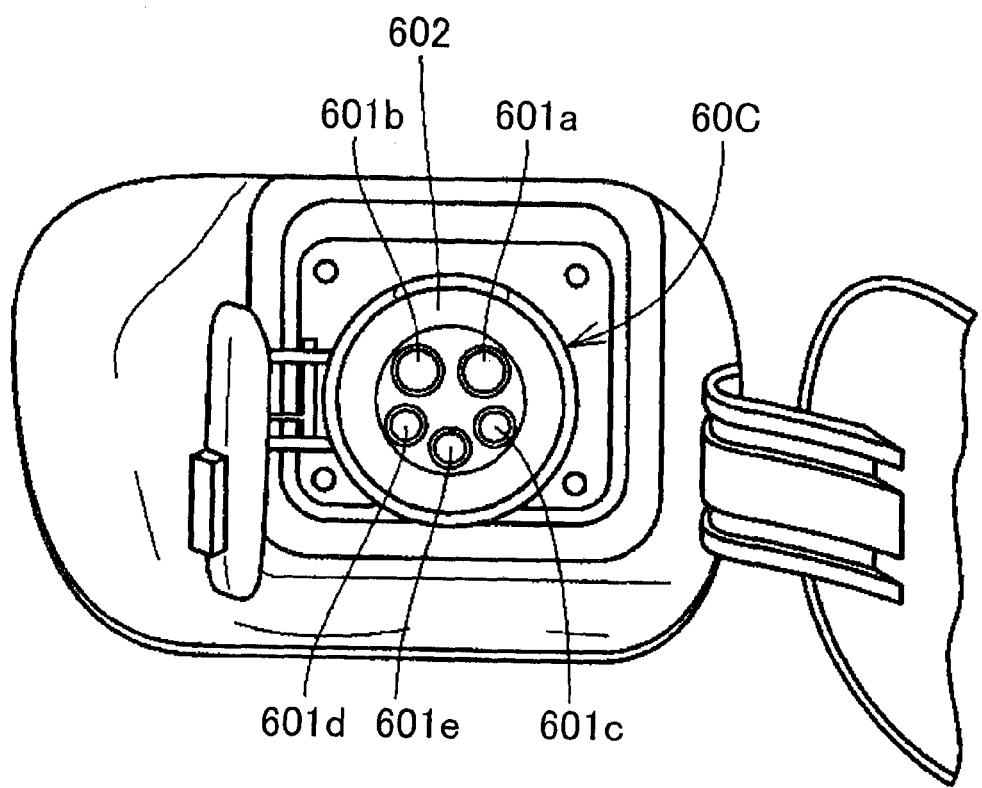
FIG. 12 is a front view of the structure of an inlet shown in FIG. 11.

FIG. 12 is a front view of the structure of the inlet 60C shown in FIG. 11. Referring to FIGS. 11 and 12, the inlet 60C includes power terminals 601a and 601b, signal terminals 601c and 601d, and an earth terminal 601e. The inlet 60C also includes a connecting portion 602.

The power terminals 601a and 601b are connected to the power lines ACL1 and ACL2, respectively. The power terminals 601a and 601b are used to send and receive power to and from the vehicle 100C and the load device 81. The signal terminals 601c and 601d are connected to a signal line, not shown, for transmitting a control pilot signal CPLT and the connection signal line PISW, respectively. The control pilot signal CPLT is a signal used when charging the vehicle 100C with an external power supply connected to the inlet 60C. The earth terminal 601e is connected to the ground wire GND.

The connecting portion 602 is provided on an outer periphery of the power terminals 601a and 601b, the signal terminals 601c and 601d, and the earth terminal 601e. The connecting portion 602 is provided to identify the shape of the connecting portion of the discharging connector 71C.

Figure 13:
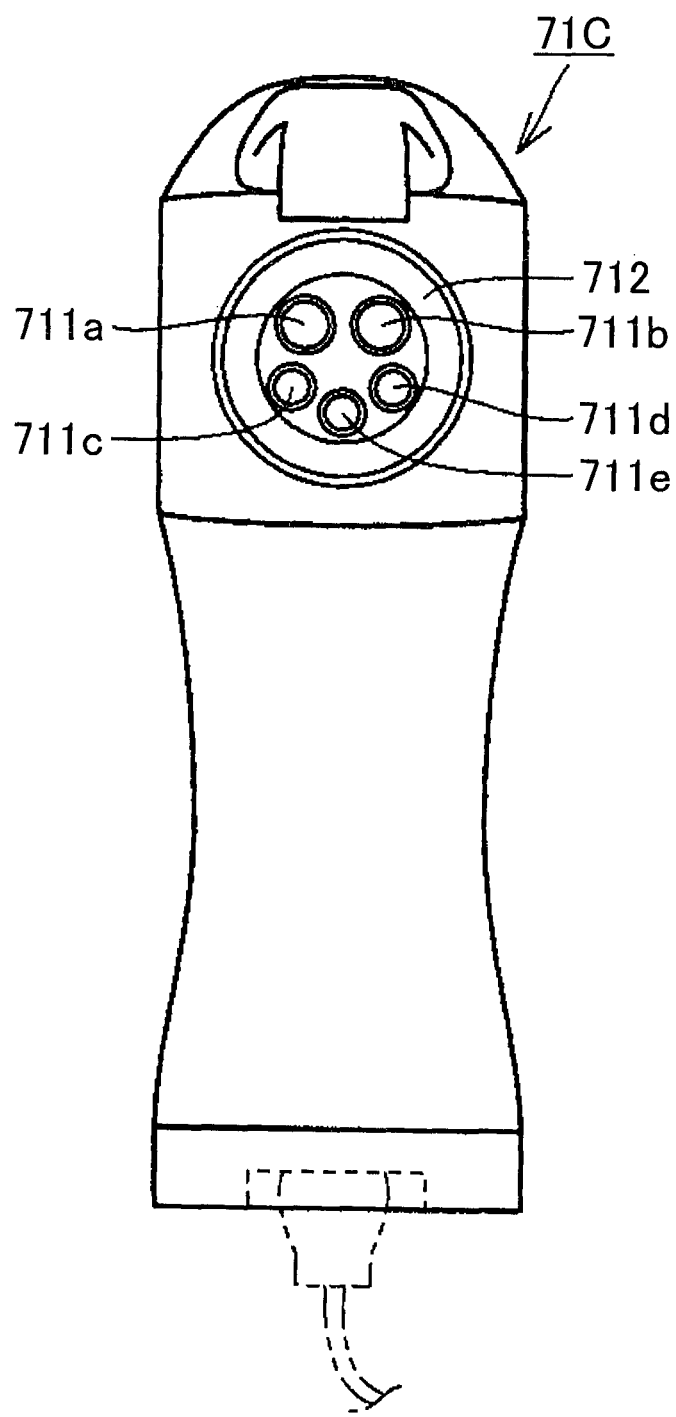
FIG. 13 is a front view of the structure of a discharging connector that is connected to the inlet shown in FIG. 12.

FIG. 13 is a front view of the structure of the discharging connector 71C that is connected to the inlet 60C shown in FIG. 12. Referring to FIGS. 11 to 13, the discharging connector 71C includes power terminals 711a and 711b, signal terminals 711c and 711d, and an earth terminal 711e. The discharging connector 71C also includes a connecting portion 712.

The power terminals 711a and 711b are terminals for connecting to the power terminals 601a and 601b, respectively. The signal terminals 711c and 711d are terminals for connecting to the signal terminals 601c and 601d, respectively. The earth terminal 711e is a terminal for connecting to the earth terminal 601e.

The connecting portion 712 is provided on an outer periphery of the power terminals 711a and 711b, the signal terminals 711c and 711d, and the earth terminal 711e. The shape of the connecting portion 712 is set according to the required voltage and the maximum current value of the load device 81. Hereinafter, the shape of the connecting portion 712 will be described in detail. The shape of the connecting portion 712 described below is only one example, and is not limited to this shape.

Figure 14:
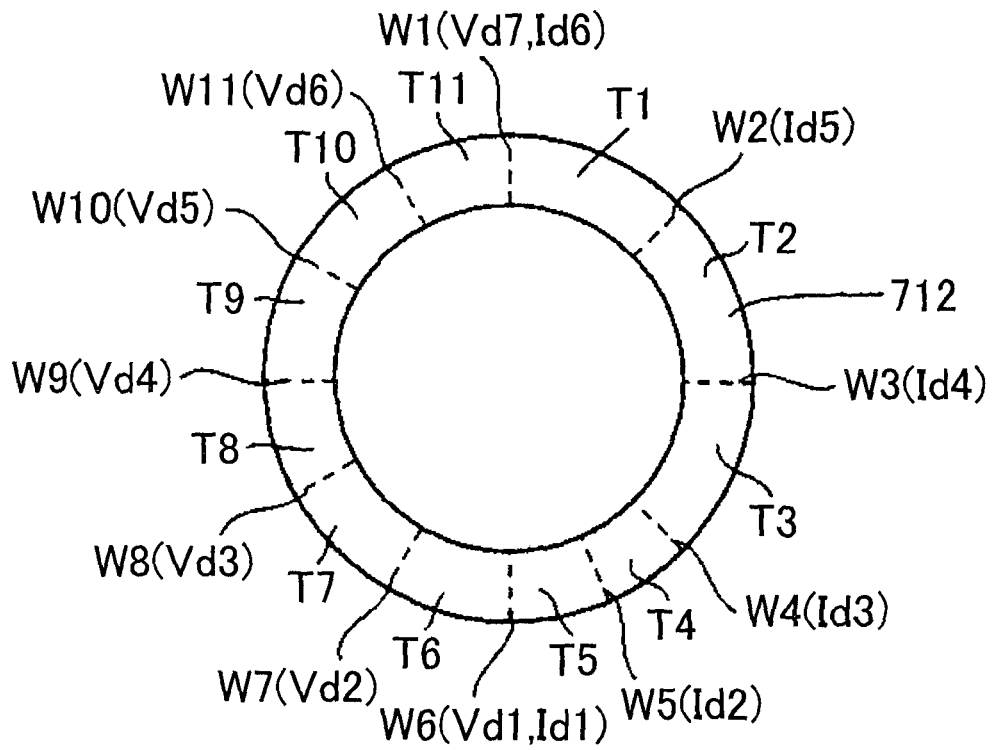
FIG. 14 is a view illustrating a method for setting the shape of a connecting portion of the discharging connector shown in FIG. 13.

FIG. 14 is a view illustrating a method for setting the shape of the connecting portion 712 of the discharging connector 71C shown in FIG. 13. Referring to FIG. 14, a concavo-convex portion is formed on the connecting portion 712, based on the required voltage and the maximum current value of the load device 81. More specifically, the size of the concavo-convex portion of the connecting portion 712 is set based on the required voltage and the maximum current value of the load device 81.

More specifically, the connecting portion 712 has regions T1 to T11 that are divided in the circumferential direction by broken lines W1 to W11. The broken lines W1 to W6 are boundaries for setting current values Id6 to Id1, and the broken lines W6 to W11 and W1 are boundaries for setting current values Vd1 to Vd7. The shape of the connecting portion 712 is determined by the boundaries indicated by the broken lines that correspond to the required voltage and the maximum current value of the load device 81. More specifically, the connecting portion 712 is divided into two regions by a broken line that corresponds to the required voltage of the load device 81 and a broken line that corresponds to the maximum current value of the load device 81. A convex portion is formed in one of the divided regions, and a concave portion is formed in the other of the divided regions.

Figure 15:
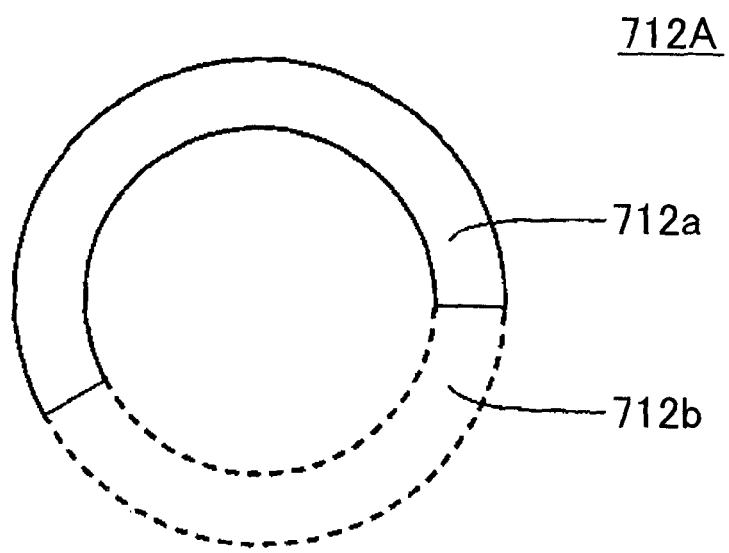
FIG. 15 is a view of one example shape of the connecting portion of the discharging connector according to the fourth example embodiment of the invention.

FIG. 15 is a view of one example shape of the connecting portion of the discharging connector according to the fourth example embodiment of the invention. Referring to FIGS. 14 and 15, a case will be described in which the required voltage of the load device 81 is Vd3 and the maximum current value of the load device 81 is Id4. In this case, the shape of a connecting portion 712A is determined by the broken lines W3 and W8. That is, a convex portion 712a is formed in the regions T1, T2, and T8 to T11, and a concave portion 712b is formed in the regions T3 to T7.

Figure 16:
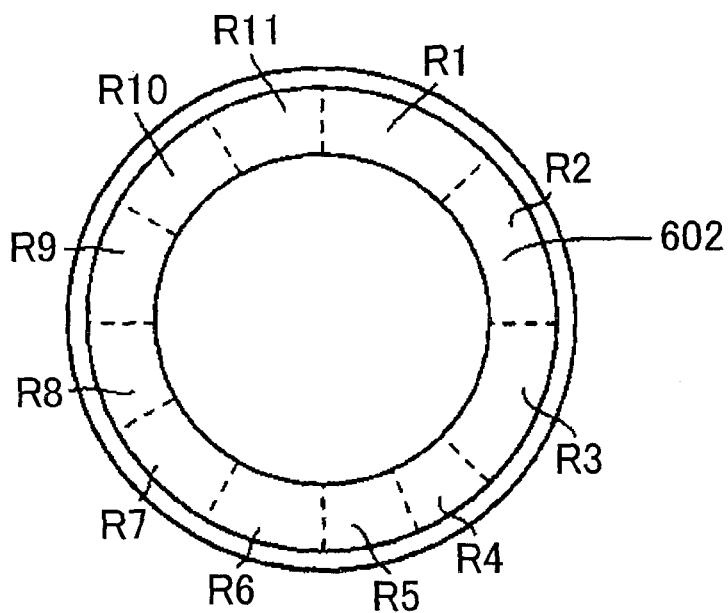
FIG. 16 is a view illustrating the connecting portion of the inlet shown in FIG. 12.

FIG. 16 is a view illustrating the connecting portion 602 of the inlet 60C shown in FIG. 12. Referring to FIG. 16, the connecting portion 602 has regions R1 to R11 that correspond to the regions T1 to T11 of the connecting portion 712. A detector, not shown, for identifying the shape of the connecting portion 712 is provided in each of these regions R1 to R11. The detector is a switch, for example.

When the discharging connector 71C is connected to the inlet 60C, the switch corresponding to the region where the convex portion of the connecting portion 712 is formed closes. The detector identifies the shape of the connecting portion 712 by the open/closed state of the switch, and outputs a signal indicative of the shape of the connecting portion 712 to the shape identifying portion 65. The shape identifying portion 65 controls the circuit 62 based on a signal from the detector of the connecting portion 602.

Here, the shape identifying portion 65 identifies the shape of the connecting portion 712 based on the signal from the detector of the connecting portion 602, and changes the resistance value of the variable resistor R6 according to the shape of the connecting portion 712. At this time, the resistance value of the variable resistor R6 is set such that the potential VP becomes a potential according to the required voltage and the maximum current value of the load device 81, between the potential V1 and the potential V2 (FIG. 3). The control unit 50C calculates the required voltage and the maximum current value of the load device 81 based on the potential VP. Accordingly, the required voltage and the maximum current value of the load device 81 are transmitted from the discharging connector 71C to the vehicle 100C.

The discharging connector 71C and the inlet 60C are each connected to terminals provided thereon, so the relative positional relationship in the circumferential direction of the discharging connector 71C and the inlet 60C is primarily determined. Therefore, the shape identifying portion 65 may falsely recognize the shape of the connecting portion 712.

As described above, in this fourth example embodiment, the shape of the connecting portion 712 of the discharging connector 71C is set according to the required voltage and the maximum current value of the load device 81, and the potential VP of the connection signal line PISW is set by setting the resistance value of the variable resistor R6 of the circuit 62 provided in the inlet 60C of the vehicle 100C according to the shape of the connecting portion 712. Accordingly, the discharging connector 71C is able to transmit information by changing the potential VP of the connection signal line PISW. Therefore, according to this fourth example embodiment, it is possible to transmit information necessary when supplying power from the vehicle 100C to the load device 81 according to the shape of the discharging connector 71C.

In a modified example of the fourth example embodiment, a case will be described in which the shape of the connecting portion of the discharging connector is set according to the voltage that is able to be handled by the load device (hereinafter, simply referred to as the "corresponding voltage") and the maximum current value, and the shape of the connecting portion of the inlet is set according to the output voltage of the vehicle and the maximum value of the current output by the vehicle (hereinafter, simply referred to as the "maximum output current value"). In this case, the shape of the connecting portion of the discharging connector and the shape of the connecting portion of the inlet may be formed such that the vehicle and the load device are unable to be connected together if the combination of the vehicle and the load device is unsuitable. This makes it possible to prevent a load device that is unable to handle the power supplied from the vehicle from being connected to the vehicle.

Figure 17:
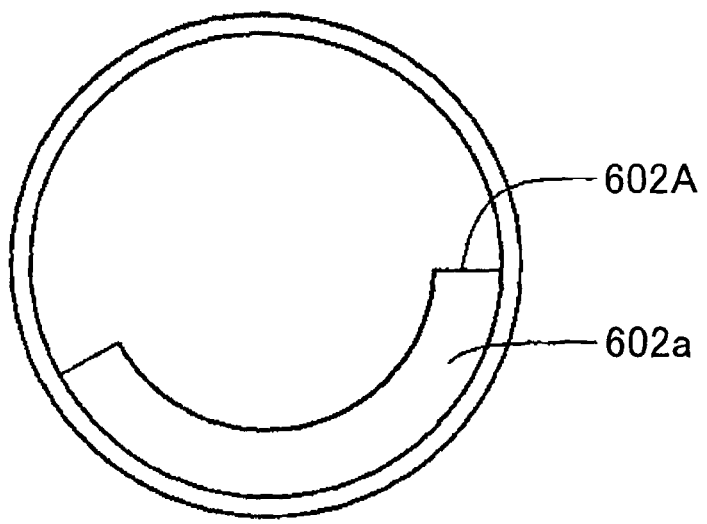
FIG. 17 is a view of an example shape of the inlet according to a modified example of the fourth example embodiment of the invention.

FIG. 17 is a view of one example shape of the inlet according to this modified example of the fourth example embodiment of the invention. Referring to FIG. 17, a concavo-convex portion corresponding to the output voltage and the maximum output current value of the vehicle 100C is formed on a connecting portion 602A of the inlet 60C. Meanwhile, a concavo-convex portion corresponding to the corresponding voltage and the maximum output current value of the load device 81 is formed on the connecting portion 712 of the discharging connector 71C.

The shapes of the concavo-convex portion of the connecting portion 602A and the concavo-convex portion of the connecting portion 712 are set such that the discharging connector 71C is able to be connected to the inlet 60C when the corresponding voltage of the load device 81 is equal to or greater than the output voltage of the vehicle 100C, and the maximum current value of the load device 81 is equal to or greater than the maximum output current value of the vehicle 100C.

More specifically, the connecting portion 602A has regions T1 to T11 that are divided in the circumferential direction by broken lines W1 to W11, similar to the fourth example embodiment. The broken lines W1 to W6 correspond to current values Id6 to Id1, and the broken lines W6 to W11 and W1 correspond to voltage values Vd1 to Vd7. The shape of the connecting portion 602A is determined by the broken lines corresponding to the output voltage and the maximum output current value of the vehicle 100C. More specifically, the connecting portion 602A is divided into two regions by a broken line corresponding to the output voltage of the vehicle 100C, and a broken line corresponding to the maximum output current value. A convex portion is formed on one of the divided regions and a concave portion is formed on the other of the divided regions.

As one example of the connecting portion 602A, a concavo-convex portion 602a that corresponds to when the output voltage of the vehicle 100C is Vd3 and the maximum output current value of the vehicle 100C is Id4 is formed.

Figure 18:
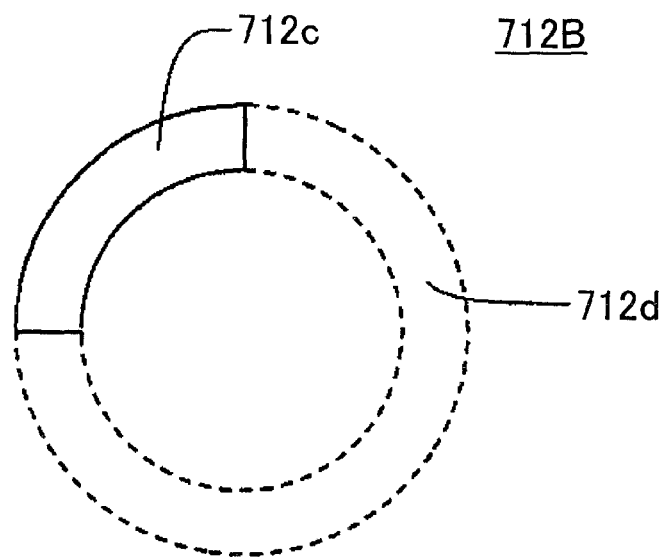
FIG. 18 is a view of an example shape of the connecting portion of the discharging connector according to the modified example of the fourth example embodiment of the invention.
Figure 19:
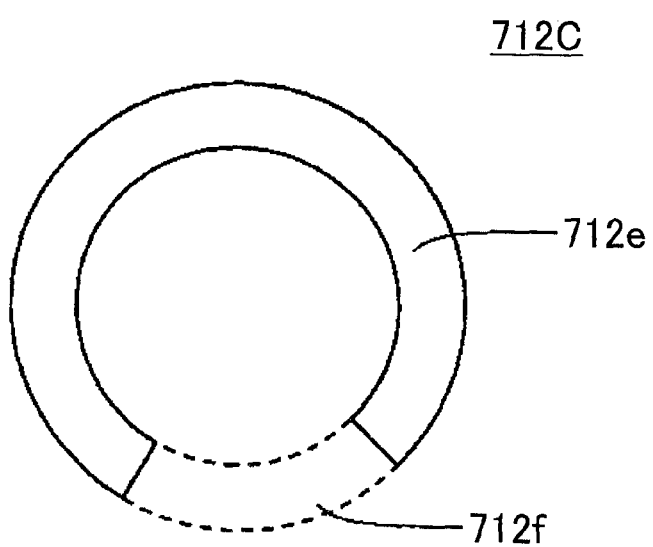
FIG. 19 is a view of another example shape of the connecting portion of the discharging connector according to the modified example of the fourth example embodiment of the invention.

FIGS. 18 and 19 are views of example shapes of the connecting portion of the discharging connector according to the modified example of the fourth example embodiment of the invention. A case in which the required voltage of the load device 81 is Vd4 and the maximum current value of the load device 81 is Id6 will be described with reference to FIG. 18 as well as FIG. 14. In this case, a shape of a connecting portion 712B is determined by the broken lines W1 and W4. That is, a convex portion 712c is formed in the regions T9 to T11, and a concave portion 712d is formed in the regions T1 to T8. Thus, the discharging connector 71C having the connecting portion 712B is able to be connected to the inlet 60C having the connecting portion 602A.

A case in which the required voltage of the load device 81 is Vd2 and the maximum current value of the load device 81 is Id3 will be described with reference to FIG. 19 as well as FIG. 14. In this case, a shape of a connecting portion 712C is determined by the broken lines W4 and W7. That is, a convex portion 712e is formed in the regions T1 to T3 and T7 to T11, and a concave portion 712f is formed in regions T4 to T6. Thus, the discharging connector 71C having the connecting portion 712C is not able to be connected to the inlet 60C having the connecting portion 602A.

As described above, in this modified example of the fourth example embodiment, the shape of the connecting portion 712 of the discharging connector 71C is set according to the required voltage and the maximum current value of the load device 81, and the shape of the connecting portion 602 of the inlet 60C is set according to the output voltage and the maximum output current value of the vehicle 100C. Therefore, the shape of the connecting portion of the discharging connector and the shape of the connecting portion of the inlet are able to be set such that the vehicle 100C and the load device 81 are unable to be connected together when the combination of the vehicle 100C and the load device 81 is unsuitable. Thus, according to this modified example of the fourth example embodiment, it is possible to prevent the load device 81 that is unable to handle the power supplied from the vehicle from being connected to the vehicle 100C.

In the fourth example embodiment, a case is described in which the size of the concavo-convex portion provided on the connecting portion of the discharging connector is set according to the required voltage and the maximum current value of the load device. In a fifth example embodiment of the invention, a case will be described in which the position of the concavo-convex portion provided on the connecting portion of the discharging connector is set according to the required voltage and the maximum current value of the load device. In this fifth example embodiment, the position of the concavo-convex portion may also be set according to one of the required voltage of the load device and the maximum current value of the load device.

The overall structure of the vehicle according to the fifth example embodiment is the same as the overall structure of the vehicle according to the first example embodiment shown in FIG. 1. A shape identifying portion 65 according to the fifth example embodiment identifies a position of a concavo-convex portion provided on a connecting portion 712D of a discharging connector 71D. Hereinafter, a shape of the connecting portion 712D will be described in detail. The shape of the connecting portion 712D described below is only an example and is not limited to this shape.

FIG. 20 is a view illustrating a method for setting the shape of the connecting portion of the discharging connector according to this fifth example embodiment of the invention. Referring to FIG. 20, the position of the concavo-convex portion provided on the connecting portion 712D is set according to the required voltage and the maximum current value of the load device 81.

More specifically, the connecting portion 712D has regions T101 to T104 in different positions in the circumferential direction. The regions T101 to T104 correspond to voltage values Vd1 to Vd4 and current values Id1 to Id4. A concave portion is formed in on the connecting portion 712D, in a region corresponding to the required voltage and the maximum current value of the load device 81.

FIG. 21 is a view illustrating a connecting portion of an inlet according to this fifth example embodiment of the invention. Referring to FIG. 21, a connecting portion 602B has regions R101 to R104 corresponding to the regions T101 to T104 of the connecting portion 712D. A detector, not shown, for identifying the shape of the connecting portion 712D is provided in each of the regions R101 to R104. The detector is a switch, for example.

When the discharging connector 71D is connected to an inlet 60D, the switch corresponding to the region where the concave portion of the connecting portion 712D is formed opens. The detector identifies the shape of the connecting portion 712D by the open/closed state of the switch, and outputs a signal indicative of the shape of the connecting portion 712D to the shape identifying portion 65. The shape identifying portion 65 controls the circuit 62 based on a signal from the detector of the connecting portion 602B.

Here, the shape identifying portion 65 identifies the shape of the connecting portion 712D based on the signal from the detector of the connecting portion 602B, and changes the resistance value of the variable resistor R6 according to the shape of the connecting portion 712D, similar to the fourth example embodiment. At this time, the resistance value of the variable resistor R6 is set such that the potential VP becomes a potential according to the required voltage and the maximum current value of the load device 81, between the potential V1 and the potential V2. A control unit 50D calculates the required voltage and the maximum current value of the load device 81 based on the potential VP. Accordingly, the required voltage and the maximum current value of the load device 81 are transmitted from the discharging connector 71D to a vehicle 100D.

The discharging connector 71D and the inlet 60D are each connected to terminals provided thereon, so the relative positional relationship in the circumferential direction of the discharging connector 71D and the inlet 60D is primarily determined. Therefore, the shape identifying portion 65 may falsely recognize the shape of the connecting portion 712D.

As described above, in this fifth example embodiment, the position of the concavo-convex portion provided on the connecting portion 712D is set according to the required voltage and the maximum current value of the load device 81, and the potential VP of the connection signal line PISW is set by setting the resistance value of the variable resistor R6 of the circuit 62 provided in the inlet 60D according to the position of the concavo-convex portion provided on the connecting portion 712D. Accordingly, the discharging connector 71D is able to transmit information by changing the potential VP of the connection signal line PISW. Therefore, according to this fifth example embodiment, it is possible to transmit information necessary when supplying power from the vehicle 100D to the load device 81 according to the position of the concavo-convex portion provided on the discharging connector 71D.

In a modified example of the fifth example embodiment of the invention, a case will be described in which the position of a concavo-convex portion provided on a connecting portion of a discharging connector is set according to the required voltage and the maximum current value of the load device, and the position of a concavo-convex portion provided on a connecting portion of an inlet is set according to the output voltage and the maximum output current value of a vehicle. In this case, the position of the concavo-convex portion of the discharging connector and the position of the concavo-convex portion of the inlet may be set such that the vehicle and the load device are unable to be connected together when the combination of the vehicle and the load device is unsuitable. Therefore, a load device that is unable to handle power supplied from the vehicle is able to be prevented from being connected to the vehicle.

FIG. 22 is a view of one example shape of a connecting portion of an inlet according to this modified example of the fifth example embodiment of the invention. Referring to FIG. 22, a concavo-convex shape corresponding to the output voltage and the maximum output current value of the vehicle 100D is formed on a connecting portion 602C. Meanwhile, a concavo-convex shape corresponding to the corresponding voltage and the maximum current value of the load device 81 is formed on the connecting portion 712D of the discharging connector 71D.

The shapes of the concavo-convex portion of the connecting portion 602C and the concavo-convex portion of the connecting portion 712D are set such that the discharging connector 71D is able to be connected to the inlet 60D when the corresponding voltage of the load device 81 is equal to or greater than the output voltage of the vehicle 100D, and the maximum current value of the load device 81 is equal to or greater than the maximum output current value of the vehicle 100D.

More specifically, similar to the fifth example embodiment, the connecting portion 602C has regions T101 to T104 in different positions in the circumferential direction. The regions T101 to T104 correspond to voltage values Vd1 to Vd4 and current values Id1 to Id4. A convex portion is formed on the connecting portion 602C, in a region corresponding to the output voltage and the maximum output current value of the vehicle 100D.

As an example of the connecting portion 602C, a convex portion 602b that corresponds to when the output voltage of the vehicle 100D is Vd1 and the maximum output current value of the vehicle 100D is Id1 is formed.

Figure 24:
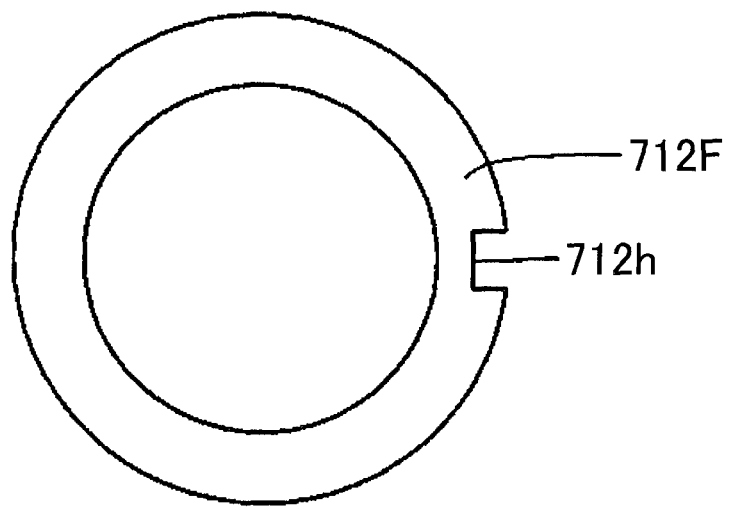
FIG. 24 is a view of another example shape of a connecting portion of the discharging connector according to the modified example of the fifth example embodiment of the invention.

FIGS. 23 and 24 are views of example shapes of the connecting portion of the discharging connector according to this modified example of the fifth example embodiment of the invention. A case in which the required voltage of the load device 81 is Vd1 and the maximum current value of the load device 81 is Id1, for example, will be described with reference to FIG. 23 as well as FIG. 20. In this case, a concave portion 712g is formed in the region T101 on a connecting portion 712E. Therefore, the discharging connector 71D having the connecting portion 712E is able to be connected to the inlet 60D having the connecting portion 602C.

A case in which the required voltage of the load device 81 is Vd2 and the maximum current value of the load device 81 is Id2 will be described with reference to FIG. 24 as well as FIG. 20. In this case, a convex portion 712h is formed in the region T102 on a connecting portion 712F. Thus, the discharging connector 71D having the connecting portion 712F is unable to be connected to the inlet 60D having the connecting portion 602C.

As described above, in this modified example of the fifth example embodiment, the position of the concavo-convex portion provided on the connecting portion of the discharging connector is set according to the required voltage and the maximum current value of the load device 81, and the position of the concavo-convex portion provided on the connecting portion of the inlet is set according to the output voltage and the maximum output current value of the vehicle 100D. Therefore, the shape of the connecting portion of the discharging connector and the shape of the connecting portion of the inlet are able to be set such that the vehicle 100D and the load device 81 are not able to be connected together when the combination of the vehicle 100D and the load device 81 is unsuitable. Thus, according to this modified example of the fifth example embodiment, the load device 81 that is unable to handle power supplied from the vehicle is able to be prevented from being connected to the vehicle 100D.

In this modified example of the fifth example embodiment, the convex portion formed on the connecting portion 602C is not limited to one, i.e., a plurality of convex portions may also be provided. Also, the concave portion formed on the connecting portions 712E and 712F is not limited to one, i.e., a plurality of concave portions may also be provided.

In the fourth and fifth example embodiments, a case is described in which information necessary when supplying power from the vehicle to the load device is transmitted according to the potential of the connection signal line. In a sixth example embodiment of the invention, a case will be described in which a signal indicative of the shape of a connecting portion of a discharging connector is output to a control unit, and the information is transmitted without using the connection signal line PISW.

Figure 25:
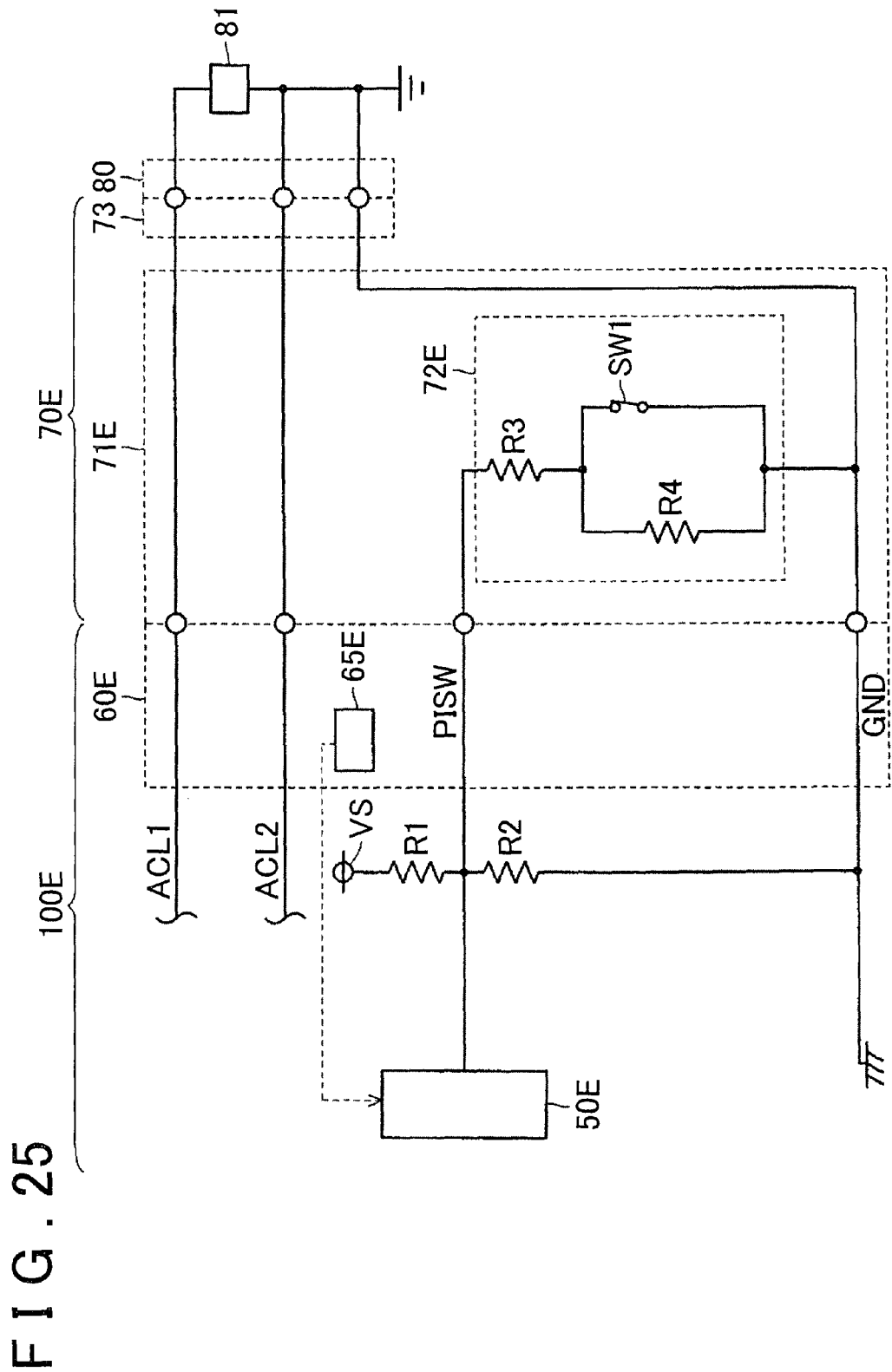
FIG. 25 is a circuit diagram of the connection state of a power cable, a load device, and a vehicle to which a discharging control system according to a sixth example embodiment of the invention is applied.

FIG. 25 is a circuit diagram of the connection state of a power cable, a load device, and a vehicle to which a discharging control system according to the sixth example embodiment of the invention is applied. The overall structure of the vehicle according to the sixth example embodiment is the same as the overall structure of the vehicle according to the first example embodiment shown in FIG. 1. Referring to FIG. 25, an inlet 60E of a vehicle 100E according to the sixth example embodiment includes a shape identifying portion 65E. A circuit 72E of a discharging connector 71E according to the sixth example embodiment has a structure similar to that of the circuit 72 shown in FIG. 2, except for that the resistor R5 is not provided.

The shape of a connecting portion of the discharging connector 71E is set according to the required voltage and the maximum current value of the load device 81, similar to the fourth and fifth example embodiments.

The shape identifying portion 65E identifies a shape of a connecting portion of the discharging connector 71E, similar to the fourth and fifth example embodiments. The shape identifying portion 65E outputs a signal indicative of the shape of the connecting portion of the discharging connector 71E to a control unit 50E. The control unit 50E controls the power converter 30 of the vehicle 100E based on the signal received from the shape identifying portion 65E.

As described above, in this sixth example embodiment, the shape of the connecting portion of the discharging connector 71E is set according to the required voltage and the maximum current value of the load device 81, and the shape identifying portion 65E provided in the inlet 60E of the vehicle 100E outputs a signal indicative of the shape of the connecting portion to the control unit 50E. Therefore, according to this sixth example embodiment, information necessary when supplying power from the vehicle 100E to the load device 81 is able to be transmitted according to the shape of the discharging connector 71E.

Figure 26:
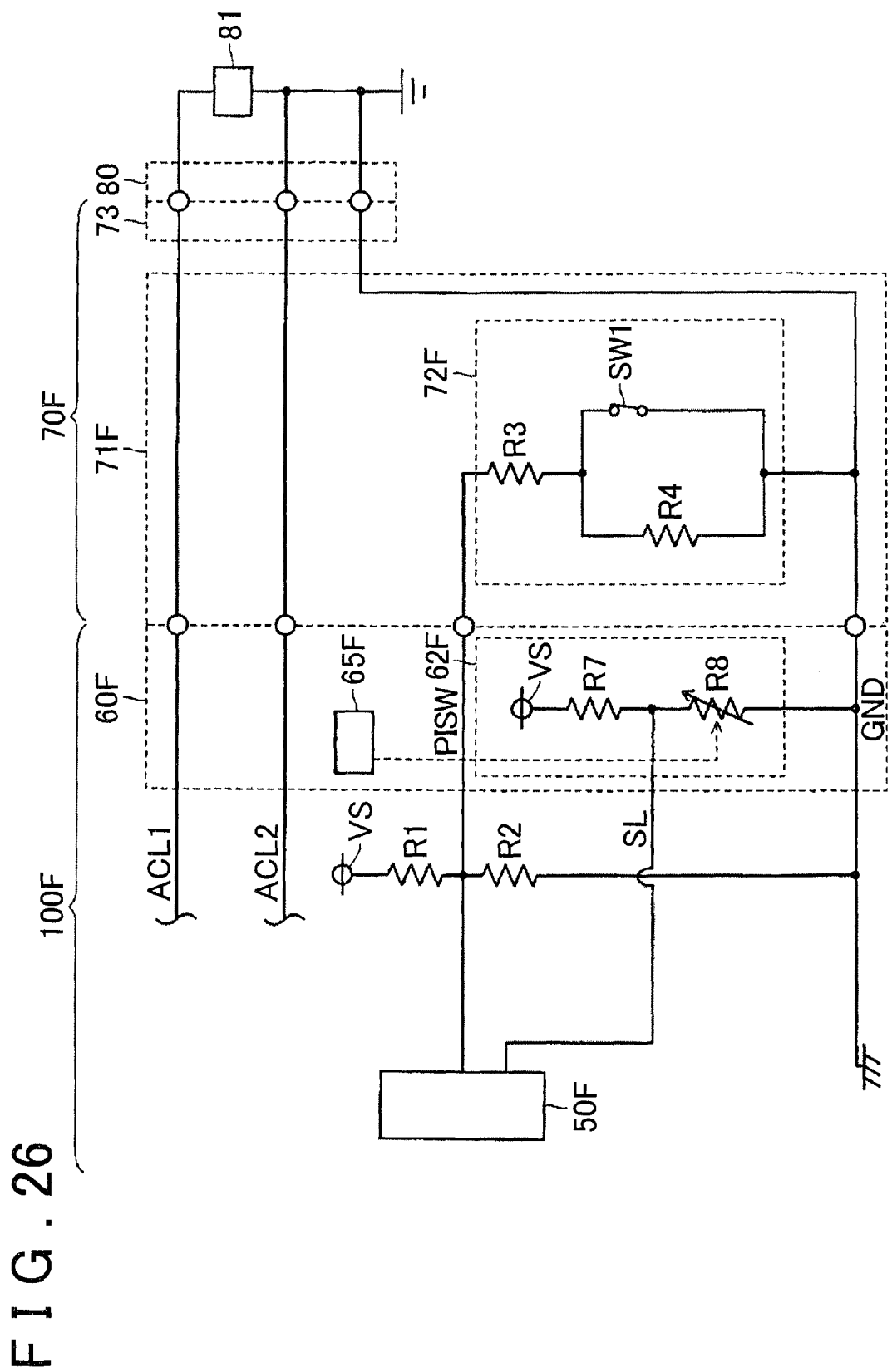
FIG. 26 is a circuit diagram of the connection state of a power cable, a load device, and a vehicle to which a discharging control system according to a modified example of the sixth example embodiment of the invention is applied.

FIG. 26 is a circuit diagram of the connection state of a power cable, a load device, and a vehicle to which a discharging control system according to a modified example of the sixth example embodiment of the invention is applied. An inlet 60F of a vehicle 100F according to the modified example of the sixth example embodiment includes a circuit 62F and a shape identifying portion 65F.

The circuit 62F has a variable resistor R7 and a variable resistor R8. The resistor R7 and the variable resistor R8 are connected in series between a power supply node VS and a ground wire GND. The variable resistor R8 is controlled by a signal from the shape identifying portion 65F. A connection node of the resistor R7 and the variable resistor R8 is connected to the control unit 50F via a signal line SL.

The shape of the connecting portion of the discharging connector 71F is set according to the required voltage and the maximum current value of the load device 81, similar to the fourth and fifth example embodiments.

The shape identifying portion 65F identifies the shape of the connecting portion of the discharging connector 71F, similar to the fourth and fifth example embodiments. The shape identifying portion 65F changes the resistance value of the variable resistor R8 according to the identified shape.

The control unit 50F controls a physical quantity related to discharging from the vehicle 100F to the load device 81 based on the potential of the signal line SL.

In this modified example of the sixth example embodiment, the shape of the connecting portion of the discharging connector 71F is set according to the required voltage and the maximum current value of the load device 81, and the shape identifying portion 65F provided in the inlet 60F of the vehicle 100F changes the potential of the signal line SL by changing the resistance value of the variable resistor R8. Therefore, according to this modified example of the sixth example embodiment, information necessary when supplying power from the vehicle 100F to the load device 81 is able to be transmitted without using the connection signal line PISW.

In the first to the third example embodiments described above, the discharging connector 71, 71A, and 71B may also include an input portion for a user to set a physical quantity related to discharging from the vehicle 100 to the load device 81. In this case, the discharging connector 71, 71A, and 71B operates the potential VP of the connection signal line PISW according to an output from the input portion. Therefore, the discharging connector 71, 71A, and 71B is able to transmit a physical quantity related to discharging from the vehicle 100 to the load device 81 to the vehicle 100, in response to the input portion being operated.

Information transmitted from the discharging connector to the vehicle is not limited to the required voltage and the maximum current value of the load device, i.e., it may also be an appropriate physical quantity related to discharging from the vehicle to the load device.

In the example embodiments described above, a case is described in which a hybrid vehicle equipped with the engine 2 and the motor-generators MG1 and MG2 is used, but the invention is not limited to a hybrid vehicle. That is, the invention may also be applied to an electric vehicle or a fuel cell vehicle or the like.

In the example embodiments described above, a case is described in which the charger 31 and the inverter 32 are provided separately in the power converter 30. Alternatively, however, a power converter capable of converting power in both directions may be provided instead of the charger 31 and the inverter 32. Further, when an electric air conditioner is provided in the vehicle, power may be supplied from the vehicle to the load device by an inverter for driving a compressor motor of the electric air conditioner.

The example embodiments described herein are in all respects merely examples and should in no way be construed as limiting. The scope of the invention is indicated not by the foregoing description of the example embodiments but by the scope of the claims for patent, and is intended to include all modifications that are within the scope and meanings equivalent to the scope of the claims for patent.

The invention claimed is:

1. A discharging control system for a vehicle that supplies power to a load device outside the vehicle via a power cable, the discharging control system comprising:
   a connection signal line configured such that a potential of the connection signal line changes in response to a discharging connector provided on the power cable being connected to the vehicle;
   a detector configured to detect the potential of the connection signal line; and
   a controller configured to control an appropriate physical quantity related to the power supplied from the vehicle to the load device, based on the potential detected by the detector, wherein
   the discharging connector includes a circuit that sets the potential of the connection signal line according to at least one of a required voltage and a maximum current value of the load, and
   the connection signal line is electrically connected to the circuit when the discharging connector is connected to the vehicle.

2. The discharging control system according to claim 1, wherein
   the circuit includes a resistor that sets the potential of the connection signal line according to the appropriate physical quantity.

3. The discharging control system according to claim 1, wherein
   the circuit includes a resistor that sets the potential of the connection signal line according to one of the required voltage and the maximum current, and an oscillating circuit that changes the potential of the connection signal line by an amplitude according to the other of the required voltage and the maximum current.

4. A discharging control system for a vehicle that supplies power to a load device outside the vehicle via a power cable, the discharging control system comprising:
   a connection signal line configured such that a potential of the connection signal line changes in response to a discharging connector provided on the power cable being connected to the vehicle;
   a detector configured to detect the potential of the connection signal line;
   a controller configured to control an appropriate physical quantity related to the power supplied from the vehicle to the load device, based on the potential detected by the detector;
   a circuit that sets the potential of the connection signal line according to at least one of a required voltage and a maximum current value of the load; and
   a determining device configured to determine that the discharging connector is connected to the vehicle when the potential detected by the detector is within a predetermined range, wherein
   the controller is configured to control the appropriate physical quantity based on the potential detected by the detector, when the determining device determines that the discharging connector is connected to the vehicle.

5. A vehicle that supplies power to a load device outside the vehicle via a power cable, the vehicle comprising a discharging control system, the discharging control system includes:
   a connection signal line configured such that a potential of the connection signal line changes in response to a discharging connector provided on the power cable being connected to the vehicle;
   a detector configured to detect the potential of the connection signal line; and
   a controller configured to control an appropriate physical quantity related to the power supplied from the vehicle to the load device, based on the potential detected by the detector, wherein
   the discharging connector includes a circuit that sets the potential of the connection signal line according to at least one of a required voltage and maximum current value of the load, and
   the connection signal line is electrically connected to the circuit when the discharging connector is connected to the vehicle.

* * * * *